United States Patent
Adidharma et al.

(10) Patent No.: US 11,499,928 B2
(45) Date of Patent: Nov. 15, 2022

(54) METHODS AND SYSTEMS FOR ISOCHORIC MEASUREMENTS USING DIFFERENTIAL SCANNING CALORIMETRY

(71) Applicant: UNIVERSITY OF WYOMING, Laramie, WY (US)

(72) Inventors: Hertanto Adidharma, Laramie, WY (US); Sugata P. Tan, Laramie, WY (US); Morteza Dejam, Laramie, WY (US); Xingdong Qiu, Laramie, WY (US)

(73) Assignee: University of Wyoming, Laramie, WY (US)

( * ) Notice: Subject to any disclaimer, the term of this patent is extended or adjusted under 35 U.S.C. 154(b) by 378 days.

(21) Appl. No.: 16/548,898

(22) Filed: Aug. 23, 2019

(65) Prior Publication Data

US 2020/0064286 A1    Feb. 27, 2020

Related U.S. Application Data

(60) Provisional application No. 62/722,476, filed on Aug. 24, 2018.

(51) Int. Cl.
*G01N 25/02* (2006.01)
*G01N 25/08* (2006.01)

(52) U.S. Cl.
CPC .................. *G01N 25/08* (2013.01)

(58) Field of Classification Search
CPC combination set(s) only.
See application file for complete search history.

(56) References Cited

U.S. PATENT DOCUMENTS 3,665,761 A * 5/1972 Gregory ............... G01K 17/025
    374/31
8,628,238 B2 * 1/2014 Fesmire ................ G01N 25/18
    374/44

(Continued)

FOREIGN PATENT DOCUMENTS

CN    101595175 A * 12/2009    ......... C08L 23/0815
RU    2583061 C1 * 5/2016    ............ G01N 25/08

OTHER PUBLICATIONS

Ann B. Butrowa, Rickey J. Seyler, "Vapor pressure by DSC: extending ASTM E 1782 below 5 kPa", Thermochimica Acta 402, pp. 145152, 2003. (Year: 2003).*

(Continued)

*Primary Examiner* — Lisa M Caputo
*Assistant Examiner* — Nasir U. Ahmed
(74) *Attorney, Agent, or Firm* — Patterson + Sheridan, LLP

(57) ABSTRACT

In an embodiment is provided a method for measuring a vapor-liquid transition of a substance, the method including introducing a substance into a sample cell of a calorimetric block of a differential scanning calorimeter (DSC) at a first initial pressure, the system volume being constant; maintaining the substance in a vapor phase; cooling the substance at a cooling rate; and generating a thermogram. In another embodiment is provided a method for measuring a vapor-liquid transition of a substance, the method including introducing a substance into a sample cell of a calorimetric block of a DSC at a first initial pressure, the system volume being constant; maintaining the substance in a liquid phase; heating the substance at a heating rate; and generating a thermogram. In another embodiment is provided a method for measuring a vapor-liquid transition of a substance in the presence of an adsorbent.

18 Claims, 14 Drawing Sheets

(56) References Cited

U.S. PATENT DOCUMENTS

| | | | | |
|---|---|---|---|---|
| 9,040,599 | B2* | 5/2015 | Senda | C08F 4/659 |
| | | | | 521/143 |
| 9,045,601 | B2* | 6/2015 | Uehara | D01F 6/92 |
| 2013/0121369 | A1* | 5/2013 | Thoen | G01K 17/04 |
| | | | | 374/31 |

OTHER PUBLICATIONS

Anna Zaitseva et al., "Isothermal and Isobaric Vapor-Liquid Equilibrium and Excess Molar Enthalpy of the Binary Mixtures of 2-Methoxy-2-methylpropane + 2-Methyl-2-butanol or + 2-Butanol", Journal of Chemical & Engineering Data, 60, 2655-2664, 2015. (Year: 2015).*
Ke, et al, Method for Locating the Vapor-Liquid Critical Point of Multicomponent Fluid Mixtures Using a Shear Mode Piezoelectric Sensor, Analytical Chemistry, 77 (2005) pp. 85-92.
McLinden, et al, Application of a Two-sinker Densimeter for Phase-equilibrium Measurements: A New Technique for the Detection of Dew Points and Measurements on the (Methane + propane) System, Journal of Chemical Thermodynamics, 99 (2016) pp. 105-115.
Feller, et al, Determination of Liquid-Vapor Equilibria, Feb. 1950, 22 (2) pp. 338-340.
Zhou, et al, (p. Vm,T) and Phase Equilibrium Measurements for a Natural Gas-like Mixture using an Automated Isochoric Apparatus, Journal of Chemical Thermodynamics, 38 (2006) pp. 1489-1494.
Acosta-Perez, et al, Method and Uncertainties to Determine Phase Boundaries from Isochoric Data, Fluid Phase Equilibria, 283 (2009) pp. 17-21.
Barsotti, et al, A Review on Capillary Condensation in Nanoporous Media: Implications for Hydrocarbon Recovery from Tight Reservoirs, Fuel, 184 (2016) pp. 344-361.
Ye, et al, Probing Pore Blocking Effects on Multiphase Reactions within Porous Catalyst Particles Using a Discrete Model, Advances in Materials: Reaction Engineering, Kinetics and Catalysis, AIChE Journal, Oct. 31, 2015, 50 pp.
Belmabkhout, et al, Adsorption of CO2 from Dry Gases on MCM-41 Silica at Ambient Temperature and High Pressure. 1: Pure CO2 Adsorption, Chemical Engineering Science 64 (2009) pp. 3721-3728.
Thommes, et al, Physical Adsorption Characterization of Nanoporous Materials: Progress and Challenges, Adsorption 20 (2014) pp. 233-250.
Yu, et al, Adsorption of n?Pentane on Mesoporous Silica and Adsorbent Deformation, Langmuir 29 (2013) pp. 8601? 8608.
Yun et al, Adsorption of Methane, Ethane, and Their Binary Mixtures on MCM-41: Experimental Evaluation of Methods for the Prediction of Adsorption Equilibrium, Langmuir 18 (2002) pp. 2693-2701.
Shim, et al, Heterogeneous Adsorption Characteristics of Volatile Organic Compounds (VOCs) on MCM-48, Separation Science and Technology, 41(2006) pp. 3693-3719.
Morishige, et al, Nature of Adsorption and Desorption Branches in Cylindrical Pores, Langmuir 20 (2004) pp. 4503-4506.
Malanowski, Experimental Methods for Vapou-Liquid Equilibria. II. Dew—and Bubble-Point Method, Fluid Phase Equilibria, 9 (1982) pp. 311-317.
Matsuoka, et al, Determination of Solid-Liquid Phase Equilibria of Binary Organic Systems by Differential Scanning Calorimetry, Journal of Crystal Growth 96 (1989) pp. 596-604.
Maroncelli, et al, Structure of the n-Alkane Binary Solid n-C19H40/ n-C21H44 by Infrared Spectroscopy and Calorimetry, J. Phys. Chem. 89 (1985) pp. 5260-5267.
Kharrat, et al, Experimental Determination of Stability Conditions of Methane Hydrate in Aqueous Calcium Chloride Solutions Using High Pressure Differential Scanning Calorimetry, J. Chem. Thermodynamics 35 (2003) pp. 1489-1505.
Xiao, et al, Dual Function Inhibitors for Methane Hydrate, Chemical Engineering Science 64 (2009) pp. 1522-1527.
Xiao, et al, Dialkylimidazolium Halide Ionic Liquids as Dual function inhibitors for Methane Hydrate, Chemical Engineeringscience 65 (2010) pp. 3080-3087.
Richard, et al, The Performance of Ionic Liquids and Their Mixtures in Inhibiting Methane Hydrate Formation, Chemical Engineering Science, 87 (2013) pp. 270-276.
Morita, et al, Characterization of Organic Substances by Differential Thermal Analysis: General Experimental Technique, Analytical Chemistry, 27 (1995) 3, pp. 336-339.
Vassallo, et al, Precise Phase Transition Measurements of Organic Materials by Differential Thermal Analysis, Analytical Chemistry, 34 (1) Jan. 1962, pp. 132-135.
Brozena, et al, Subambient Applications of Differential Thermal Analysis for the Determination of Vapor Pressure, Thermochimica Acta, 212 (1992) pp. 63-68.
Casserino, et al, An Improved Method for Measuring Vapor Pressure by DSC with Automated Pressure Control, Thermochimica Acta, 284 (1996) pp. 145-152.
Seyler, Parameters Affecting the Determination of Vapor Pressure by Differential Thermal Methods, Thermochimica Act, 17 (1976) pp. 129-136.
Matricarde Falleiro, et al, Experimental Determination of the (Vapor + Liquid) Equilibrium Data of Binary Mixtures of Fatty Acids by Differential Scanning Calorimetry, J. Chem. Thermodynamics 42 (2010) pp. 70-77.
Khoshooei, et al, A New Analysis Method for Improving Collection of Vapor-liquid Equilibrium (VLE) Data of Binary Mixtures Using Differential Scanning Calorimetry (DSC), Thermochimica Acta 659 (2018) pp. 232-241.
Ye, et al, Probing Pore Blocking Effects on Multiphase Reactions within Porous Catalyst Particles Using a Discrete Model, AIChE Journal, Feb. 2016, 62(2), pp. 451-460.
Belmabkhout, et al, Adsorption of CO2 from Dry Gases on MCM-41 Silica at Ambient Temperature and High Pressure. 2: Adsorption of CO2/N2, CO2/CH4 and CO2/H2 Binary Mixtures, Chemical Engineering Science, 64 (2009) pp. 3729-3735.
Teklu, et al, Effect of Dilute Acid on Hydraulic Fracturing of Carbonate Rich Shales—Modeling Study, SPE-187533-MS, Society of Petroleum Engineers, for presentation at the SPE Eastern Regional Meeting, Lexington, Kentucky, USA, 2017, pp. 1-15.
Gelb, et al, Phase Separation in confined systems, Rep. Prog. Phys. 62 (1999), pp. 1573-1659.
Travalloni, et al, Thermodynamic Modeling of Confined Fluids Using an Extension of the Generalized van der Waals Theory, Chemical Engineering Science, 65 (2010) pp. 3088-3099.
Nojabaei, et al, Modeling Wellbore Transient Fluid-Temperature and—Pressure During Diagnostic Fracture Injection Testing in Unconventional Reservoirs, SPE 166120, SPE International, Society of Petroleum Engineers, 2013, pp. 1-11.
Tan, et al, Equation-of-state Modeling of Confined-Fluid Phase Equilibria in Nanopores, Fluid Phase Equilibria 393 (2015) pp. 48-63.
Sandoval, et al, Influence of Adsorption and Capillary Pressure on Phase Equilibria inside Shale Reservoirs, Energy and Fuels, 32 (2018) pp. 2819-2833.
Burgess, Adsorption Hysteresis in Porous Materials, Pure & Appl. Chem., 61 (11) 1989, pp. 1845-1852.
Erko, et al, Repeated Sorption of Water in SBA-15 Investigated by Means of In Situ Small-Angle X-ray Scattering, Journal of Physics: Condensed Matter 24 (2012), pp. 1-8.
Morishige, et al, Capillary Critical Point of Argon, Nitrogen, Oxygen, Ethylene, and Carbon Dioxide in MCM-41, Langmuir 13 (1997) pp. 3494-3498.
Russo, et al, Hydrocarbons Adsorption on Templated Mesoporous Materials: Effect of the Pore Size, Geometry and Surface Chemistry, New J Chem., 35 (2011), pp. 407-416.
Morishige, et al, Capillary Condensation of Water in Mesoporous Carbon, J. Phys. Chem., 118 (2014), pp. 4664?4669.
Morishige, et al, Adsorption Hysteresis and Pore Critical Temperature in a Single Cylindrical Pore, J. Chem. Phys. 108 (18) 1998, pp. 7821-7824.

(56) References Cited

OTHER PUBLICATIONS

Jones, et al, Phase Behaviour of Argon and Krypton Adsorbed in Mesoporous Vycor Glass, J. Phys.: Condens. Matter 15 (2003) pp. 4709-4715.

Bao, et al, Microfluidic and Nanofluidic Phase Behaviour Characterization for Industrial CO2, Oil and Gas, Lab on a Chip 17, 16 (2017) pp. 2740-2759.

Luo, et al, Effect of Confinement on the Bubble Points of Hydrocarbons in Nanoporous Media, AIChE Journal, May 2016, 62 (5), pp. 1772-1780.

Cho, et al, Bubble Point Measurements of Hydrocarbon Mixtures in Mesoporous Media, Energy and Fuels (2017) 31, pp. 3436-3444.

Liu, et al, Phase Behavior of N2/n-C4H10 in a Partially Confined Space Derived from Shale Sample, Journal of Petroleum Science and Engineering 160 (2018) pp. 442-451.

Valiullin, et al, Phase Separation of a Binary Liquid Mixture in Porous Media Studied by Nuclear Magnetic Resonance Cryoporometry, J. Chem. Phys. 116 (2002) pp. 1072-1076.

Alam, et al, Capillary Condensation and Desorption of Binary Mixtures of N2-Ar Confined in a Mesoporous Medium, Langmuir 16 (20) 2000, pp. 7551-7553.

Luo, et al, Use of Differential Scanning Calorimetry to Study Phase Behavior of Hydrocarbon Mixtures in Nano-scale Porous Media, Journal of Petroleum Science and Engineering 163 (2018) pp. 731-738.

Moerz, et al, Capillary Condensation, Freezing, and Melting in Silica Nanopores: A Sorption Isotherm and Scanning Calorimetry Study on Nitrogen in Mesoporous SBA-15, Physical Review B, 85 (2012) pp. 075403-1-075403-9.

Hofmann, et al, Formation of Periodically Arranged Nanobubbles in Mesopores: Capillary Bridge Formation and Cavitation during Sorption and Solidification in an Hierarchical Porous SBA-15 Matrix, Langmuir 32 (2016) pp. 2928? 2936.

Thommes, et al, Physisorption of Gases, with Special Reference to the Evaluation of Surface Area and Pore Size Distribution (IUPAC Technical Report), Pure Appl. Chem. 87(9-10) 2015, pp. 1051-1069.

\* cited by examiner

METHODS AND SYSTEMS FOR ISOCHORIC MEASUREMENTS USING DIFFERENTIAL SCANNING CALORIMETRY

CROSS-REFERENCE TO RELATED APPLICATIONS

This application claims priority to U.S. Provisional Patent Application No. 62/722,476, filed Aug. 24, 2018, the entirety of which is herein incorporated by reference.

BACKGROUND

Field

The present disclosure relates generally to methods and systems for differential scanning calorimetry (DSC), and more specifically to isochoric methods and systems for determining the onset conditions of vapor-liquid phase transitions of pure components and mixtures in bulk and in nanopores.

Description of Related Art

Conventional thermal analyses commonly used to measure phase transitions of substances and to identify, e.g., vapor pressures, are Differential Thermal Analysis (DTA) and Differential Scanning calorimetry (DSC). In both methods, a test sample and a reference sample are heated and cooled under identical conditions. In DTA, a temperature difference between the test and reference samples is recorded and plotted against time or temperature. When a thermal event, e.g., phase transition in crystallization occurs in the test sample, heat is released and the temperature of the test sample rises above that of the reference sample, resulting in an exothermic peak. Similarly, when melting occurs in the test sample, heat is absorbed and the temperature of the test sample drops below that of the reference sample, resulting in an endothermic peak. In heat-flux DSC, the heat flux (or flow) produced between the test and reference samples due to the temperature difference between the samples is calculated and recorded. The heating or cooling process is controlled by a single furnace. In power-compensation DSC, the temperatures of the test sample and reference sample are substantially identical and controlled by two separate furnaces. The power (or heat flow) utilized to maintain the test sample at a set temperature against the reference furnace is measured.

ASTM E1782 (Standard Test Method for Determining Vapor Pressure by Thermal Analysis), revised in 2014, provides the conventional procedure for vapor pressure measurement using DTA and DSC. For DSC, the standard test method recommends placing the substance to be measured in a hermetically sealable pan with a single pinhole in the center of the lid. Pinhole sizes ranging from approximately 50 μm to 350 μm are recommended to retain boiling endotherm sharpness. The vapor pressure measurement based on ASTM E1782 is an isobaric heating process, the pressure of which is maintained by a regulated vacuum or inert (or non-reactive) gas. Such measurements, however, suffer from inaccurate results because of, e.g., the vaporization and escape of sample through the pinhole. Such vaporization and escape of the sample is exacerbated by the inert or non-reactive gas used to maintain the pressure of the sample cell. Proper selection of a gas in accordance with ASTM E1782 is a further obstacle in its widespread applicability because the inert gas can dissolve into the substance being measured and affect the phase transition of the substance. In addition, conventional DSC methods cannot be used for volatile substances or high pressure systems because of, e.g., the pinhole in the sample cell and the dissolution of the inert gas.

Conventional DSC measurements additionally involve the difficult task of determining several measurement parameters, e.g., the size of the test sample and the size of the pinhole, both of which are optimized with the scanning rate. In addition, dew points of substances are very difficult to determine with precision and accuracy, and conventional DSC thermal analyses, including the DSC isobaric method standardized in ASTM E1782, are typically incapable of measuring dew points. Instead, dew-point measurements are typically derived by detecting the presence of condensate (visual determination), the change in fluid properties, or the change in slope of the curve of measured properties, such as density or volume versus pressure or temperature, upon crossing the substance's phase boundary.

For DTA, the standard test method is an isobaric process performed at atmospheric pressure or at an applied pressure of an inert or non-reactive gas, and recommends the use of capillary tubes, such as those having an inside diameter of 2-4 mm and a length of 25 mm. These capillary tubes can minimize, but not prevent, the escape of vapors, and thus DTA-based approaches are also inaccurate for determining the onset conditions of phase transitions of pure substances and mixtures of substances.

Measuring phase transitions of confined substances represent another challenge to conventional thermal analytical methods. Confinement in pores (e.g., nanopores) can affect a substance's fluid phase behavior by, for example, lowering the substance's vapor-to-liquid phase transition curve. Understanding the phase behavior of confined substances finds important applications in catalysis, carbon dioxide sequestration, drug delivery, enhanced coalbed methane recovery, pollution control, and separation, as well as hydrocarbon production from shale and other tight formations. Conventional methods for investigating the phase behavior of a confined pure compound generally utilize adsorption-desorption methods using different porous media. Such methods, however, are time consuming and costly, and often utilize expensive instrumentation. For example, the measurement of a single capillary condensation point can take days or even weeks. In addition, these adsorption-desorption methods suffer from inaccurate results because of, e.g., using the inflection point of an isotherm to determine the capillary condensation point. Moreover, experiments on fluid mixtures in a confined space are performed less often due to their more complex nature. Consequently, features such as the dew points and critical points of confined fluid mixtures suffer from minimal or non-existent experimental exploration, thus rendering a fundamental understanding of such systems far from complete.

Therefore, there is a need for improved methods of measuring vapor pressures of pure components and dew points of mixtures in bulk and in pores (e.g., nanopores) that overcome the problems of conventional measurements such as inaccurate results and cost inefficiency. Moreover, the ability to accurately measure volatile substances, high pressure systems, capillary condensation, and capillary evaporation of pure components and mixtures remains a need.

SUMMARY

In an embodiment is provided a process for measuring a vapor-liquid transition of a substance in a constant volume system, the process including (a) introducing a substance into a sample cell of a calorimetric block of a differential scanning calorimeter (DSC) at a first initial pressure, the system volume being constant; (b) maintaining the substance in a vapor phase; (c) cooling the substance at a cooling rate; and (d) generating a thermogram.

In another embodiment is provided a process for measuring a vapor-liquid transition of a substance in a constant volume system, the process including (a) introducing a substance into a sample cell of a calorimetric block of a differential scanning calorimeter (DSC) at a first initial pressure, the system volume being constant; (b) maintaining the substance in a liquid phase; (c) heating the substance at a heating rate; and (d) generating a thermogram.

In another embodiment is provided a process for measuring a vapor-liquid transition of a substance in a constant volume system, the process including (a) introducing an adsorbent into a sample cell of a calorimetric block of a differential scanning calorimeter, the system volume being constant; (b) introducing a substance into the sample cell at a first initial pressure; (c) maintaining the substance in a vapor phase or maintaining the substance in a liquid phase; (d) cooling the substance at a cooling rate when the process comprises maintaining the substance in a vapor phase, or heating the substance at a heating rate when the process comprises maintaining the substance in a liquid phase; and (e) generating a thermogram.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1A:
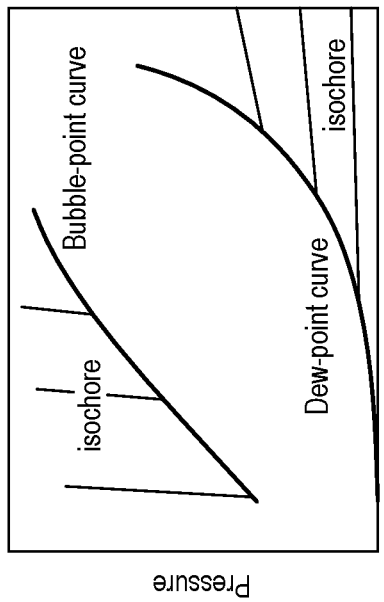
FIG. 1A is a typical pressure-temperature diagram with isochores of a pure substance.

The present disclosure provides isochoric methods and systems for measuring vapor pressures of pure substances and the dew points of a bulk mixture in the absence of pores (e.g., micropores and nanopores). The present disclosure also provides isochoric methods and systems for measuring vapor pressures of pure substances and the dew points of a bulk mixture in the presence of pores.

Isobaric DSC has been widely used to measure solid transition (melting/crystallization), and thus solid-liquid equilibria and solid-liquid-vapor equilibria, of many pure compounds and multicomponent mixtures. However, the measurement of condensation/evaporation, e.g., vapor-liquid equilibrium, using thermal analyses can be more difficult. DTA instruments that employ capillary tubes and isobaric DSC measurements including the methods of ASTM E1782 cannot accurately measure vapor pressures of pure substances and bubble points/dew points of mixtures of substances. Determination of dew points is desirable, for instance, when dealing with mixtures that exhibit retrograde condensation, such as natural gases.

The inventors have discovered an isochoric method that accurately determines the onset conditions for vapor-liquid phase transitions for substances and mixtures of substances in bulk and in pores, e.g., nanopores. The onset conditions include vapor pressures of pure, or substantially pure, substances and dew points of mixtures including two or more substances. The isochoric methods and systems described herein rival and/or surpass conventional methods for measuring vapor pressures, dew points, capillary condensation, and capillary evaporation of substances. Conventional methods, such as isobaric DSC, require optimization of the sample size, the pinhole size of the sample cell, and the heating rate of the sample in order to achieve accurate results. In contrast, the methods provided herein are not constrained by conventional limitations, because there are no sample size and pinhole size to optimize. Moreover, in contrast to conventional methods where the scanning rate (e.g., heating/cooling rate) of the sample is sample dependent, the same or similar scanning rates can be used across substances for the isochoric systems and methods described herein.

Moreover, the methods and systems described herein are applicable to, at least, volatile substances, high pressure systems, and dew point (or capillary condensation, capillary evaporation) measurements. The conventional isobaric process, e.g., the ASTM method, is intended for bubble-point measurements and not for dew point measurements. Volatile substances may evaporate and escape through the pinhole of the sample pan when performing conventional DSC methods. Similarly high pressure systems cannot be studied by conventional methods due to, e.g., the dissolution of inert gas. In contrast, the methods described herein do not utilize a sample pan having a pinhole. Conventional DSC measurements utilize an inert or non-reactive gas to control the pressure of the sample cell, but at certain pressures (e.g., high pressures), the gas can dissolve into the substance being measured and will affect the phase transition. In at least that sense, the gas may no longer be considered inert as it affects at least the bubble point of the substance being measured. The methods described herein do not utilize an inert or non-reactive gas being introduced to the sample cell.

Conventional techniques to characterize confined substances, such as adsorption experiments, using open-flow apparatus at constant pressures and gravimetric adsorption-desorption experiments for capillary condensation and capillary evaporation measurements of substances in nanopores have been performed. However, these conventional techniques suffer from high costs, are very time consuming, and are inaccurate. Light scattering, nuclear magnetic resonance, and positron annihilation spectroscopy, under isobaric conditions, have also been performed to measure capillary condensation and capillary evaporation of substances and mixtures. These conventional techniques can only be used for low pressure measurements. Moreover, the light scattering technique is restricted to use of a clear glass rod for the adsorbent.

More recently an isobaric procedure using DSC, i.e., an extension of ASTM E1782, was used to study the phase behavior of hydrocarbon mixtures in nanopores. However, this isobaric DSC procedure provides inaccurate results because the vaporization and escape of sample through the pinhole changed the mixture composition before reaching the bubble point of the fluids in the pore. As described above, the isobaric DSC method will not work for confined mixtures that contain volatile components and it would be difficult, if not impossible, to accurately measure the phase transition of mixtures at high pressures due to the dissolution of the inert or non-reactive gas used. Furthermore, the isobaric DSC method also suffers from difficulties in determining several measurement parameters, e.g., the size of the test sample, the size of the pinhole, and the scanning rate.

In addition, adsorption experiments can be very time consuming. For example, measuring one capillary condensation point or capillary evaporation point by a typical adsorption experiment can take days, or even weeks. In contrast, the isochoric DSC methods described herein can measure a capillary condensation point/capillary evaporation point in a few hours. Therefore, the DSC methods described herein can have lower labor and operation costs than typical methods for measuring confined fluids. Moreover, conventional adsorption experiments provide inaccurate results because the capillary condensation point/capillary evaporation point is determined from the inflection point of an isotherm. Such a determination is inaccurate because to find the inflection point, the data is fitted to a mathematical function or is numerically differentiated to find the maximum slope (rate of change). If the data obtained in constructing an isotherm are scattered, e.g., have large experimental error, or do not show a clear maximum slope, which is pretty common in such experiments, it is difficult to find a proper mathematical function or to find the maximum slope, and thus the determination of the inflection point becomes inaccurate.

Moreover, experiments on fluid mixtures in a confined space are performed less often due to their more complex nature. Even for fluids in the bulk phase, the phase behavior of mixtures are more complex than that of pure substances. While there is only one vapor pressure curve (or vapor-liquid transition curve) for pure substances, there are two different vapor-liquid transition curves for mixtures, e.g., dew-point and bubble-point curves. In the critical region, e.g., the region close to the critical point, of mixtures, the gas mixture can be condensed by decreasing or increasing the pressure depending on the mixture of interest and the initial pressure. For pure substances, the gas mixture can be condensed only by increasing the pressure. Consequently, features such as the dew points and critical points of confined fluid mixtures suffer from minimal or non-existent experimental exploration, thus rendering a fundamental understanding of such systems far from complete.

The methods described herein overcome these problems because the capillary condensation point/capillary evaporation point is determined from the peak of the thermogram. Using the peak of the thermogram is more accurate because the peak of the thermogram is very clear and corresponds directly to the phase transition. In addition, the typical instrumentation utilized for measuring confined fluids, such as an adsorber or other custom-built devices for adsorption-desorption experiments, are expensive or even cost prohibitive for certain industries and/or applications. In contrast, DSC instrumentation can be much less expensive, and thereby permitting more widespread use.

The present disclosure includes an isochoric method for measuring the onset of vapor-liquid phase transition of pure components and mixtures in bulk and nanopores. The method can be performed with the use of a DSC, such as a high-pressure micro differential scanning calorimeter. The method can be used to measure vapor pressures and dew points of various pure (or substantially pure) liquids and gases, and mixtures thereof, in bulk and in nanopores at different pressures or temperatures. As explained above, the method can be used to measure the onset of vapor-liquid phase transition for substances and mixtures of substances that isobaric methods cannot measure and eliminates many difficulties encountered in isobaric methods.

FIG. 1A shows a generic pressure-temperature (P-T) diagram with isochores for a pure component. When the starting point is point A in the gas phase and the cooling process is performed for a closed system at constant volume (e.g., the test system has a fixed volume), the P-T path of the DSC cooling process proceeds along the isochore until it reaches the saturated vapor pressure curve at point B. This is the dew point where the first drop of liquid appears.

Figure 1B:
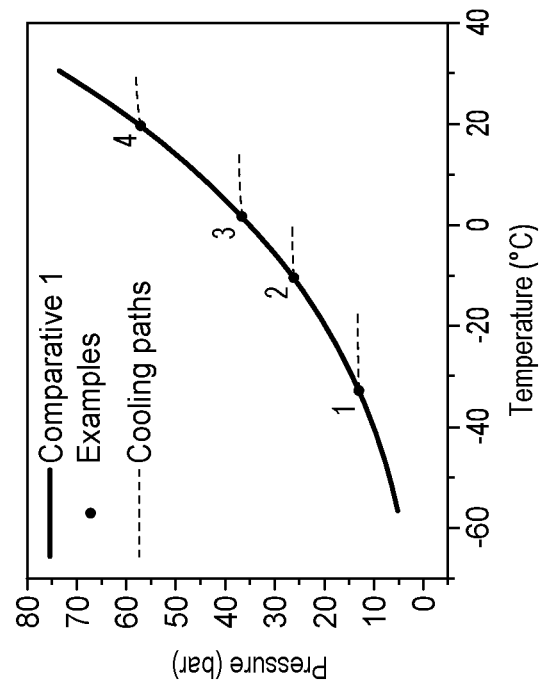
FIG. 1B is a typical pressure-temperature diagram with isochores of a mixture of substances.

FIG. 1B shows a generic P-T diagram with isochores for a mixture at a certain composition. As in the case of pure component, the ideal isochoric dew and bubble point measurements will follow the isochore, in which the conditions for the first drop of liquid and the first bubble of vapor, respectively, can be determined on cooling. In mixtures, the dew points and bubble points lie on different curves on the phase diagram sandwiching the two-phase immiscibility region.

Isochoric Dew-Point Measurement Methods

In at least one embodiment, a method for measuring a vapor-liquid transition of a substance in a constant volume system can include (a) introducing a substance into a sample cell of a calorimetric block of a differential scanning calorimeter (DSC) at a first initial pressure, the system volume being constant; (b) maintaining the substance in a vapor phase; (c) cooling the substance in the constant volume system at a cooling rate; and (d) generating a thermogram. The thermogram output can be used to determine the conditions, e.g., the pressure and temperature, of the substance's phase transition.

In some embodiments, the isochoric dew-point measurement method further includes repeating operations (a)-(d) at different initial pressures in operation (a), such as at least two, at least four, or at least five initial pressures. The different initial pressures can be higher or lower than the first initial pressure. The method can be repeated at different initial pressures in order to measure different conditions, e.g., pressure and temperature, of the substance's phase transition.

Initial pressures useful for the isochoric dew-point measurement method can depend on the substance being investigated. For $CO_2$, the initial pressures can be from about 5 bar to about 75 bar, such as about 10 bar, about 25 bar, about 40 bar, about 55 bar, or about 70 bar. For ethane, the initial pressures can be from about 1 bar to about 50 bar, such as about 15 bar, about 20 bar, about 25 bar, about 30 bar, or about 35 bar. For a methane/ethane gas mixture, the initial pressures can be from about 5 bar to about 55 bar, such as about 10 bar, about 20 bar, about 30 bar, about 40 bar, or about 50 bar.

In at least one embodiment, an adsorbent can be introduced into the sample cell of the calorimetric block of the DSC. For example, the method can include introducing an adsorbent into the sample cell of the calorimetric block of a differential scanning calorimeter, the sample cell being a constant volume system. This operation can be performed before introducing the substance into the sample cell at a first initial pressure. This operation can also be repeated for measurements at different initial pressures. The adsorbent can be an adsorbent that has micropores, mesopores, nanopores, or a combination thereof. Examples of mesoporous particles include those particles comprising silica, amorphous silica alumina, such as zeolites (e.g., ZSM and USY) and silicoaluminophosphates. Other mesoporous particles can include SBA-15, MCM-41, and particles that exist in rock formations such as shale.

In some embodiments where an adsorbent is used with a pure substance, the amount of adsorbent can be varied. In at least one embodiment when an adsorbent is used with a mixture, the amount of adsorbent can be varied and the amount of adsorbent can be selected such that the amount does not change (or has a minor effect on) the composition of the mixture in the bulk. The amount can vary depending on the mixture being measured and the adsorbent.

In at least one embodiment, the isochoric dew-point measurement method can include evacuating the system (which includes the sample cell) prior to introducing the substance into the sample cell. The system includes the calorimetric block of the differential scanning calorimeter (DSC). This operation can also be repeated for measurements at different initial pressures. In at least one embodiment, maintaining the substance in a vapor phase can include heating or cooling the sample, depending on the phase of the sample being introduced. In at least one embodiment, maintaining the substance in a vapor phase can include heating or cooling the sample cell to an initial temperature above the saturation temperature (e.g., the boiling point temperature) of the substance, heating or cooling the sample cell to an initial temperature above the dew point temperature of the substance, or a combination thereof.

Example substances to be measured by the methods provided herein and example scanning rates used in the methods described herein are provided below.

Isochoric Evaporation-Point Methods

In at least one embodiment, a method for measuring a vapor-liquid transition of a substance in a constant volume system can include (a) introducing a substance into a sample cell of a calorimetric block of a differential scanning calorimeter (DSC) at a first initial pressure, the system volume being constant; (b) maintaining the substance in a liquid phase; (c) heating the substance in the constant volume system at a heating rate; and (d) generating a thermogram. The thermogram output can be used to determine the conditions, e.g., the pressure and temperature, of the substance's phase transition.

In some embodiments, the isochoric evaporation-point measurement method further includes repeating operations (a)-(d) at different initial pressures in operation (a), such as at least two, at least four, or at least five initial pressures. The different initial pressures can be higher or lower than the first initial pressure. The procedure can be repeated at different initial pressures in order to measure different conditions, e.g., pressure and temperature, of the substance's phase transition. Initial pressures that can be used for the evaporation-point measurement method include those provided above.

In some embodiments, the isochoric evaporation-point measurement method can be used with an adsorbent.

Example adsorbents, and a discussion thereof, useful for the isochoric evaporation point method described herein is provided above.

In at least one embodiment, the isochoric evaporation-point measurement method can include evacuating the system (which includes the sample cell) prior to introducing the substance into the sample. The system includes the calorimetric block of the differential scanning calorimeter (DSC). This method can also be repeated for measurements at different initial pressures. In at least one embodiment, maintaining the substance in a liquid phase can include heating or cooling the sample, depending on the phase of the sample being introduced. In at least one embodiment, maintaining the substance in a liquid phase can include heating or cooling the sample cell to an initial temperature below the saturation temperature (e.g., the boiling point temperature) of the substance, heating or cooling the sample cell to an initial temperature below the evaporation point temperature of the substance, or a combination thereof.

The substance to be measured by the methods provided herein can be any substance capable of being measured by a DSC instrument. That is, a constraint imposed on the type of substance can be based to the specification of the DSC instrument. For example, a DSC can operate within a certain range of pressures and/or temperatures, which can prevent measurements on certain substances. A DSC that operates at very low temperatures, such as −196° C., can allow for measurements on the vapor pressure and capillary condensation of methane.

Non-limiting examples of substances that can be measured by the methods provided herein include organic compounds and inorganic compounds, such as hydrocarbons, substituted hydrocarbons, organic mixtures, and/or aqueous mixtures that contain salts. The hydrocarbons and substituted hydrocarbons can be linear, branched, or cyclic (including polycyclic), and when cyclic, aromatic or non-aromatic ring structures.

Suitable hydrocarbons and substituted hydrocarbons can include $C_1$-$C_{100}$ unsubstituted or $C_1$-$C_{100}$ substituted hydrocarbons (such as $C_1$-$C_{40}$ unsubstituted or $C_1$-$C_{40}$ substituted hydrocarbons, such as $C_1$-$C_{20}$ unsubstituted or $C_1$-$C_{20}$ substituted hydrocarbons, such as $C_1$-$C_{10}$ unsubstituted or $C_1$-$C_{10}$ substituted hydrocarbons, such as $C_1$-$C_6$ unsubstituted or $C_1$-$C_6$ substituted hydrocarbons) that may be linear, branched, or cyclic, and when cyclic, aromatic or non-aromatic. Examples of such hydrocarbons include, but are not limited to, methane, ethane, n-propane, n-butane, isobutane, sec-butane, tert-butane, pentane, isopentane, hexane, octane, cyclopropane, cyclobutane, cyclopentane, cyclohexane, cyclooctane, aryl groups, such as benzene, toluene, naphthalene, and their substituted analogues.

The term "substituted hydrocarbon" refers to a hydrocarbon in which at least one hydrogen atom of the hydrocarbon has been substituted with at least one heteroatom (such as halogen, e.g., Br, Cl, F or I) or heteroatom-containing group (such as a functional group, e.g., —NR*$_2$, —OR*, —SR*, —SeR*, —TeR*, —PR*$_2$, —AsR*$_2$, —SbR*$_2$, —BR*$_2$, —SiR*$_3$, —GeR*$_3$, —SnR*$_3$, —PbR*$_3$, —(CH$_2$)$_q$—SiR*$_3$, and the like, where q is 1 to 10 and each R* is independently hydrogen, a hydrocarbon, and two or more R* may join together to form a substituted or unsubstituted completely saturated, partially unsaturated, or aromatic cyclic or polycyclic ring structure), or where at least one heteroatom has been inserted within a hydrocarbon ring. Cyclic structures (including aromatic structures) can include substituted and unsubstituted $C_4$-$C_{62}$ cyclic structures, such as substituted and unsubstituted $C_4$-$C_{20}$ cyclic structures, such as substituted and unsubstituted $C_3$-$C_{10}$ cyclic structures, and their substituted analogs. Examples of such cyclic structures include cyclohexane, cyclopentane, and their substituted analogs.

Aromatic structures can include phenyl, naphthyl, xylyl, and heteroaromatic structures. Heteroaromatic structures include those structures where a ring carbon atom (or two or three ring carbon atoms) has been replaced with a heteroatom, such as N, O, or S. Aromatic structures can also include pseudoaromatic heterocycles. The aromatic structures can be substituted, whereby one or more hydrogen groups is replaced by a hydrocarbon, substituted hydrocarbon, heteroatom, or heteroatom containing group. The heteroaromatic structures can be substituted whereby one or more hydrogen groups is replaced by a hydrocarbon, substituted hydrocarbon, heteroatom, or heteroatom containing group.

Where isomers of a named hydrocarbon or aromatic structure exist (e.g., n-pentane and iso-pentane) reference to one member of the group (e.g., n-pentane) shall expressly disclose the remaining isomers (e.g., iso-pentane) in the family. Likewise, reference to a hydrocarbon, a substituted hydrocarbon, an aromatic structure, substituted aromatic structure, heteroaromatic structure, and substituted heteroaromatic structure without specifying a particular isomer (e.g., pentane) expressly discloses all isomers (e.g., n-pentane, iso-pentane).

Substituted hydrocarbons can include alcohols and ethers, such as methanol, ethanol, propanol, isopropanol, n-butanol, isobutanol, tert-butanol, pentanol, hexanol, heptanol, octanol, decanol, phenol, ethylene oxide, diethyl ether, methoxyethane, dimethoxyethane, methoxybutane, tetrahydrofuran, glycols, anisole. The hydrocarbon group of the alcohol and ether can be an alkyl group or an aryl group (such as a $C_1$-$C_{20}$, such as a $C_1$-$C_{10}$ hydrocarbon, such as a $C_1$-$C_6$ hydrocarbon). The alkyl group may be straight chain, branched, or cyclic. The alkyl group may be saturated or unsaturated.

Further non-limiting examples of substances that can be measured by the methods provided herein include substances that are gases at about 25° C. and about 1 atm, such carbon containing gases, such as CO and $CO_2$, as well as those substances discussed above that are gases at about 25° C. and about 1 atm such as methane. Other gases that can be measured include $N_2$, $SO_2$, and Ar. Further non-limiting examples of substances that can be measured by the methods provided herein include substances that are liquids at about 25° C. and about 1 atm, such carbon containing liquids, such as those substances discussed above that are liquids at about 25° C. and about 1 atm such as pentane. The substances can be extracted from shale, petroleum reservoirs, coalbeds, rock formations. In some embodiments, the substance is natural gas.

In some embodiments, the substance to be measured can be a pure substance that is free from other components. The substance can be substantially pure, such as about 95% pure, or 99% pure. The substance to be measured can include binary mixtures, or mixtures comprising more than two substances. The mixture can contain an unlimited number of substances, though a constraint can be the ability to accurately measure the amount of the individual substances in the mixture being tested.

The DSC scanning rate can influence the thermogram and the quality of the results obtained. The scanning rate can be referred to interchangeably as the cooling rate or the heating rate. In the methods provided herein, if the scanning rate is low enough, the system can be assumed to be at equilibrium throughout the process, and the recorded pressures corresponding to the controlled temperatures represent the equilibrium pressures.

In some embodiments, the scanning rate (or heating rate or cooling rate) for the methods provided herein can be about 0.005° C./min or more, such as from about 0.005° C./min to about 10° C./min or to about 5° C./min, such as from about 0.01° C./min to about 1° C./min, such as from about 0.01° C./min to about 0.5° C./min, such as from about 0.01° C./min to about 0.1° C./min, such as about 0.01° C./min, about 0.02° C./min, about 0.03° C./min, about 0.04° C./min, about 0.05° C./min, about 0.06° C./min, about 0.07° C./min, such as about 0.08° C./min, about 0.09° C./min, or about 0.1° C./min. In some embodiments, the scanning rate for the methods provided herein is about 10° C./min or less, such as about 5° C./min or less, such as about 2° C./min or less, such as about 1° C./min or less, such as about 0.5° C./min or less, such as about 0.3° C./min or less, such as about 0.2° C./min or less, such as about 0.1° C./min or less, such as about 0.05° C./min or less, such as about 0.03° C./min or less, such as about 0.02° C./min or less, such as about 0.01° C./min or less.

Depending on whether the substance of interest is in the liquid phase or the gas phase in the sample cell, the scanning rate can be a cooling rate or a heating rate. For example, when the substance of interest is in the gas phase in the sample cell (e.g., $CO_2$), the system temperature is decreased at a constant cooling rate while the heat flow and pressure history are continuously recorded. When the substance of interest exists in the liquid phase in the sample cell (e.g., methanol), the system temperature is heated at a constant heating rate while the heat flow and pressure history are continuously recorded.

The scanning rate can be a cooling rate or a heating rate based on whether the isochoric DSC measurement method is the isochoric dew-point measurement method or isochoric evaporation-point measurement method. When the isochoric dew-point measurement method is used, the scanning rate can be a cooling rate. When the isochoric evaporation-point measurement method is used, the scanning rate can be a heating rate.

Embodiments Listing

The present disclosure provides, among others, the following embodiments, each of which may be considered as optionally including any alternate embodiments.

Clause 1. A process for measuring a vapor-liquid transition of a substance in a constant volume system, comprising: (a) introducing a substance into a sample cell of a calorimetric block of a differential scanning calorimeter (DSC) at a first initial pressure, the system volume being constant; (b) maintaining the substance in a vapor phase; (c) cooling the substance at a cooling rate; and (d) generating a thermogram.

Clause 2. A process for measuring a vapor-liquid transition of a substance in a constant volume system, comprising: (a) introducing a substance into a sample cell of a calorimetric block of a differential scanning calorimeter (DSC) at a first initial pressure, the system volume being constant; (b) maintaining the substance in a liquid phase; (c) heating the substance at a heating rate; and (d) generating a thermogram.

Clause 3. The process of Clause 1 or Clause 2, further comprising evacuating the system prior to introducing the substance into the sample cell.

Clause 4. The process of any one of Clauses 1 to 3, further comprising: performing operation (a) at a second initial pressure, the second initial pressure being different from the first initial pressure; and performing operations (b), (c), and (d).

Clause 5. The process of any one of Clauses 1 to 4, further comprising: performing operations (a)-(d) at a series of initial pressures, the initial pressures being different from each other and from the first and second initial pressures.

Clause 6. The process of any one of Clauses 1 to 5, wherein the substance is a pure substance.

Clause 7. The process of any one of Clauses 1 to 5, wherein the substance is a substantially pure substance.

Clause 8. The process of any one of Clauses 1 to 5, wherein the substance is more than one compound.

Clause 9. The process of any one of Clauses 1 to 5, wherein the substance is a gas at 25° C. and 1 atm.

Clause 10. The process of any one of Clauses 1 to 5, wherein the substance is a liquid at 25° C. and 1 atm.

Clause 11. The process of any one of Clauses 1 to 11, wherein when the process includes cooling the substance at a cooling rate, the cooling rate is from about 0.01° C./min to about 1° C./min, or from about 0.01° C./min to about 0.5° C./min, or from about 0.01° C./min to about 0.1° C./min; or wherein when the process includes heating the substance at a heating rate, the heating rate is from about 0.01° C./min to about 1° C./min, or from about 0.01° C./min to about 0.5° C./min, or from about 0.01° C./min to about 0.1° C./min.

Clause 12. The process of any one of Clauses 1 to 11, wherein when the process includes cooling the substance at a cooling rate, the cooling rate is about 0.03° C./min; or wherein when the process includes heating the substance at a cooling rate, the heating rate is about 0.03° C./min.

Clause 13. The process of any one of Clauses 1 to 12, wherein the substance comprises a hydrocarbon (such as a $C_1$-$C_{20}$ unsubstituted hydrocarbon, such as a $C_1$-$C_{10}$ unsubstituted hydrocarbon), a substituted hydrocarbon (such as a $C_1$-$C_{20}$ substituted hydrocarbon, such as a $C_1$-$C_{10}$ substituted hydrocarbon), or a combination thereof.

Clause 14. The process of any one of Clauses 1 to 13, wherein the substance comprises methane, ethane, methanol, or a combination thereof.

Clause 15. The process of any one of Clauses 1 to 10, wherein the substance comprises a gas such as Na, $SO_2$, Ar, a carbon containing gas (such as CO and/or $CO_2$), or a combination thereof.

Clause 16. The process of any one of Clauses 1 to 15, further comprising determining the conditions (e.g., a pressure and a temperature) of the substance's phase transition based on the thermogram.

Clause 17. A process for measuring a vapor-liquid transition of a substance in a constant volume system in the presence of adsorbent, comprising: (a) introducing an adsorbent into a sample cell of a calorimetric block of a differential scanning calorimeter, the system volume being constant; (b) introducing a substance into the sample cell at a first initial pressure; (c) maintaining the substance in a vapor phase; (d) cooling the substance at a cooling rate; and (e) generating a thermogram.

Clause 18. A process for measuring a vapor-liquid transition of a substance in a constant volume system, comprising: (a) introducing an adsorbent into a sample cell of a calorimetric block of a differential scanning calorimeter, the system volume being constant; (b) introducing a substance into the sample cell at a first initial pressure; (c) maintaining the substance in a liquid phase; (d) heating the substance at a heating rate; and (e) generating a thermogram.

Clause 19. The process of Clause 17 or Clause 18, wherein the adsorbent comprises a microporous particle, a nanoporous particle, a mesoporous particle, or a combination thereof.

Clause 20. The process of any one of Clauses 17 to 19, wherein the adsorbent comprises a mesoporous particle.

Clause 21. The process of any one of Clauses 17 to 20, wherein the adsorbent comprises silica.

Clause 22. The process of any one of Clauses 17 to 21, further comprising evacuating the system prior to introducing the substance into the sample cell.

Clause 23. The process of any one of Clauses 17 to 22, further comprising: performing operations (a)-(e), wherein operation (b) is performed at a second initial pressure, the second initial pressure being different from the first initial pressure.

Clause 24. The process of any one of Clauses 17 to 23, further comprising: performing operations (a)-(e) at a series of initial pressures, the initial pressures being different from each other and from the first and second initial pressures.

Clause 25. The process of any one of Clauses 17 to 24, wherein the substance is a pure substance.

Clause 26. The process of any one of Clauses 17 to 24, wherein the substance is a substantially pure substance.

Clause 27. The process of any one of Clauses 17 to 24, wherein the substance is more than one compound.

Clause 28. The process of any one of Clauses 17 to 24, wherein the substance is a gas at 25° C. and 1 atm.

Clause 29. The process of any one of Clauses 17 to 24, wherein the substance is a liquid at 25° C. and 1 atm.

Clause 30. The process of any one of Clauses 17 to 29, wherein when the process includes cooling the substance at a cooling rate, the cooling rate is from about 0.01° C./min to about 1° C./min, or from about 0.01° C./min to about 0.5° C./min, or from about 0.01° C./min to about 0.1° C./min; or wherein when the process includes heating the substance at a heating rate, the heating rate is from about 0.01° C./min to about 1° C./min, or from about 0.01° C./min to about 0.5° C./min, or from about 0.01° C./min to about 0.1° C./min.

Clause 31. The process of any one of Clauses 17 to 30, wherein when the process includes cooling the substance at a cooling rate, the cooling rate is about 0.03° C./min; or wherein when the process includes heating the substance at a cooling rate, the heating rate is about 0.03° C./min.

Clause 32. The process of any one of Clauses 17 to 31, wherein the substance comprises a hydrocarbon (such as a $C_1$-$C_{20}$ unsubstituted hydrocarbon, such as a $C_1$-$C_{10}$ unsubstituted hydrocarbon), a substituted hydrocarbon (such as a $C_1$-$C_{20}$ substituted hydrocarbon, such as a $C_1$-$C_{10}$ substituted hydrocarbon), or a combination thereof.

Clause 33. The process of any one of Clauses 17 to 32, wherein the substance comprises methane, ethane, methanol, or a combination thereof.

Clause 34. The process of any one of Clauses 17 to 33, wherein the substance comprises a gas such as $N_2$, $SO_2$, Ar, a carbon containing gas (such as CO and/or $CO_2$), or a combination thereof.

Clause 35. The process of any one of Clauses 17 to 34, further comprising determining the conditions (e.g., a pressure and a temperature) of the substance's phase transition based on the thermogram.

Clause 36. A process for measuring a vapor-liquid transition of a substance in a constant volume system, comprising: (a) introducing a substance into a sample cell of a calorimetric block of a differential scanning calorimeter (DSC) at a first initial pressure, the system volume being constant, and the substance comprises a hydrocarbon, a substituted hydrocarbon, a carbon containing gas, or a combination thereof, (b) maintaining the substance in a vapor phase; (c) cooling the substance at a cooling rate of about 1° C./min or less; and (d) generating a thermogram.

Clause 37. A process for measuring a vapor-liquid transition of a substance in a constant volume system, comprising: (a) introducing a substance into a sample cell of a calorimetric block of a differential scanning calorimeter (DSC) at a first initial pressure, the system volume being constant and the substance comprises a hydrocarbon, a substituted hydrocarbon, a carbon containing gas, or a combination thereof, (b) maintaining the substance in a liquid phase; (c) heating the substance at a heating rate of about 1° C./min or less; and (d) generating a thermogram.

Clause 38. The process of Clause 36 or Clause 37, further comprising introducing an adsorbent into the sample cell prior to introducing the substance into the sample cell.

Clause 39. The process of any one of Clauses 36 to 38, wherein the adsorbent comprises a microporous particle, a nanoporous particle, a mesoporous particle, or a combination thereof.

Clause 40. The process of any one of Clauses 36 to 39, wherein the adsorbent comprises a mesoporous particle.

Clause 41. The process of any one of Clauses 36 to 40, wherein the adsorbent comprises silica.

Clause 42. The process of any one of Clauses 36 to 41, further comprising evacuating the system prior to introducing the substance into the sample cell.

Clause 43. The process of any one of Clauses 36 to 42, further comprising: performing operations (a)-(d), wherein operation (a) is performed at a second initial pressure, the second initial pressure being different from the first initial pressure.

Clause 44. The process of any one of Clauses 36 to 43, further comprising: performing operations (a)-(d) at a series of initial pressures, the initial pressures being different from each other and from the first and second initial pressures.

Clause 45. The process of any one of Clauses 36 to 44, wherein the substance is a pure substance.

Clause 46. The process of any one of Clauses 36 to 44, wherein the substance is a substantially pure substance.

Clause 47. The process of any one of Clauses 36 to 44, wherein the substance is more than one compound.

Clause 48. The process of any one of Clauses 36 to 44, wherein the substance is a gas at 25° C. and 1 atm.

Clause 49. The process of any one of Clauses 36 to 44, wherein the substance is a liquid at 25° C. and 1 atm.

Clause 50. The process of any one of Clauses 36 to 49, wherein when the process includes cooling the substance at a cooling rate, the cooling rate is from about 0.01° C./min to about 1° C./min, or from about 0.01° C./min to about 0.5° C./min, or from about 0.01° C./min to about 0.1° C./min; or wherein when the process includes heating the substance at a heating rate, the heating rate is from about 0.01° C./min to about 1° C./min, or from about 0.01° C./min to about 0.5° C./min, or from about 0.01° C./min to about 0.1° C./min.

Clause 51. The process of any one of Clauses 36 to 50, wherein when the process includes cooling the substance at a cooling rate, the cooling rate is about 0.03° C./min; or wherein when the process includes heating the substance at a cooling rate, the heating rate is about 0.03° C./min.

Clause 52. The process of any one of Clauses 36 to 51, wherein the substance comprises a hydrocarbon (such as a $C_1$-$C_{20}$ unsubstituted hydrocarbon, such as a $C_1$-$C_{10}$ unsubstituted hydrocarbon), a substituted hydrocarbon (such as a $C_1$-$C_{20}$ substituted hydrocarbon, such as a $C_1$-$C_{10}$ substituted hydrocarbon), or a combination thereof.

Clause 53. The process of any one of Clauses 36 to 53, wherein the substance comprises methane, ethane, methanol, or a combination thereof.

Clause 54. The process of any one of Clauses 36 to 54, wherein the substance comprises a gas such as $N_2$, $SO_2$, Ar, a carbon containing gas (such as CO and/or $CO_2$), or a combination thereof.

Clause 55. A process for measuring a vapor-liquid transition of a substance in a constant volume system, comprising (a) introducing a substance into a sample cell of a calorimetric block of a differential scanning calorimeter (DSC) at a first initial pressure, the system volume being constant and the substance comprises a hydrocarbon, a substituted hydrocarbon, a carbon containing gas, a non-carbon containing gas, or a combination thereof, and optionally introducing an adsorbent into the sample cell prior to introducing the substance into the sample cell; (b) maintaining the substance in a vapor phase; (c) cooling the substance at a cooling rate of about 1° C./min or less; and (d) generating a thermogram.

Clause 56. A process for measuring a vapor-liquid transition of a substance in a constant volume system, comprising (a) introducing a substance into a sample cell of a calorimetric block of a differential scanning calorimeter (DSC) at a first initial pressure, the system volume being constant and the substance comprises a hydrocarbon, a substituted hydrocarbon, a carbon containing gas, or a combination thereof, and optionally introducing an adsorbent into the sample cell prior to introducing the substance into the sample cell; (b) maintaining the substance in a liquid phase; (c) heating the substance at a heating rate of about 1° C./min or less; and (d) generating a thermogram.

Clause 57. The process of Clause 55 or Clause 56, further comprising introducing an adsorbent into the sample cell prior to introducing the substance into the sample cell.

Clause 58. The process of any one of Clauses 55 to 57, wherein the adsorbent comprises a microporous particle, a nanoporous particle, a mesoporous particle, or a combination thereof.

Clause 59. The process of any one of Clauses 55 to 58, wherein the adsorbent comprises a mesoporous particle.

Clause 60. The process of any one of Clauses 55 to 59, wherein the adsorbent comprises silica.

Clause 61. The process of any one of Clauses 55 to 60, further comprising evacuating the system prior to introducing the substance into the sample cell.

Clause 62. The process of any one of Clauses 55 to 61, further comprising: performing operations (a)-(d), wherein operation (a) is performed at a second initial pressure, the second initial pressure being different from the first initial pressure.

Clause 63. The process of any one of Clauses 55 to 62, further comprising: performing operations (a)-(d) at a series of initial pressures, the initial pressures being different from each other and from the first and second initial pressures.

Clause 64. The process of any one of Clauses 55 to 63, wherein the substance is a pure substance, or wherein the substance is a substantially pure substance, or wherein the substance is more than one compound, or wherein the substance is a gas at 25° C. and 1 atm, or wherein the substance is a liquid at 25° C. and 1 atm.

Clause 65. The process of any one of Clauses 55 to 64, wherein when the process includes cooling the substance at a cooling rate, the cooling rate is from about 0.01° C./min to about 1° C./min, or from about 0.01° C./min to about 0.5° C./min, or from about 0.01° C./min to about 0.1° C./min; or wherein when the process includes heating the substance at a heating rate, the heating rate is from about 0.01° C./min to about 1° C./min, or from about 0.01° C./min to about 0.5° C./min, or from about 0.01° C./min to about 0.1° C./min.

Clause 66. The process of any one of Clauses 55 to 65, wherein when the process includes cooling the substance at a cooling rate, the cooling rate is about 0.03° C./min; or wherein when the process includes heating the substance at a cooling rate, the heating rate is about 0.03° C./min.

Clause 67. The process of any one of Clauses 55 to 66, wherein when the substance comprises a hydrocarbon, the hydrocarbon is a $C_1$-$C_{20}$ unsubstituted hydrocarbon, such as a $C_1$-$C_{10}$ unsubstituted hydrocarbon, or a combination thereof; or wherein when the substance comprises a substituted hydrocarbon, the substituted hydrocarbon is a $C_1$-$C_{20}$ substituted hydrocarbon, such as a $C_1$-$C_{10}$ substituted hydrocarbon, or a combination thereof; or a combination thereof.

Clause 68. The process of any one of Clauses 55 to 67, wherein when the substance comprises a hydrocarbon, the hydrocarbon is methane, ethane, or a combination thereof, or wherein when the substance comprises a substituted hydrocarbon, the substituted hydrocarbon, wherein when the substance comprises a carbon containing gas, the carbon containing gas is CO, $CO_2$, or a combination thereof, or wherein when the substance comprises a non-carbon containing gas, the non-carbon containing gas is $N_2$, $SO_2$, Ar, or a combination thereof.

Examples

Figure 2A:
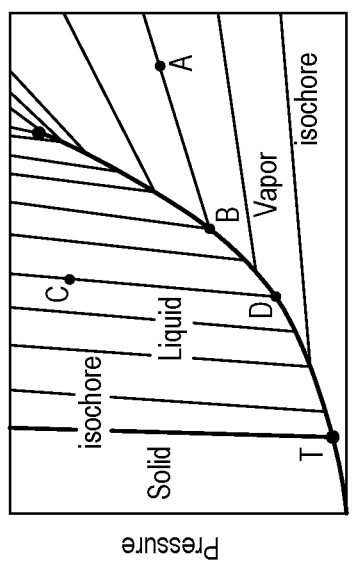
FIG. 2A is an example thermogram and pressure history of a $CO_2$ vapor pressure measurement according to at least one embodiment of the present disclosure.

A. Measuring the Onset of the Vapor-Liquid Phase Transition in Bulk—Isochoric Dew-Point Measurement Vapor Pressure of $CO_2$ Vapor pressures of $CO_2$ are measured using the isochoric dew-point measurement. An example thermogram of the vapor pressure measurement of $CO_2$ using the isochoric dew-point measurement method, along with the pressure history, is shown in FIG. 2A. The temperature curve is a straight line with a constant slope throughout the process because a constant cooling rate can be used. Prior to the phase transition from vapor to liquid, the pressure of the test vessel declines gradually because of the decreasing temperature in the closed system. When a phase transition from vapor to liquid occurs, heat is released from the test sample, leading to a sharp increase in the heat flow curve, as shown in FIG. 2A. At the same time, the pressure of the system starts to decrease faster due to condensation. The onset condition of the phase transition is determined from the intersection point between the baseline and the tangent line (the dashed line) of the rising part of the exothermic peak (point A). The condensation temperature (point B) and vapor pressure (point C) can be determined by drawing a vertical line through point A.

Figure 2B:
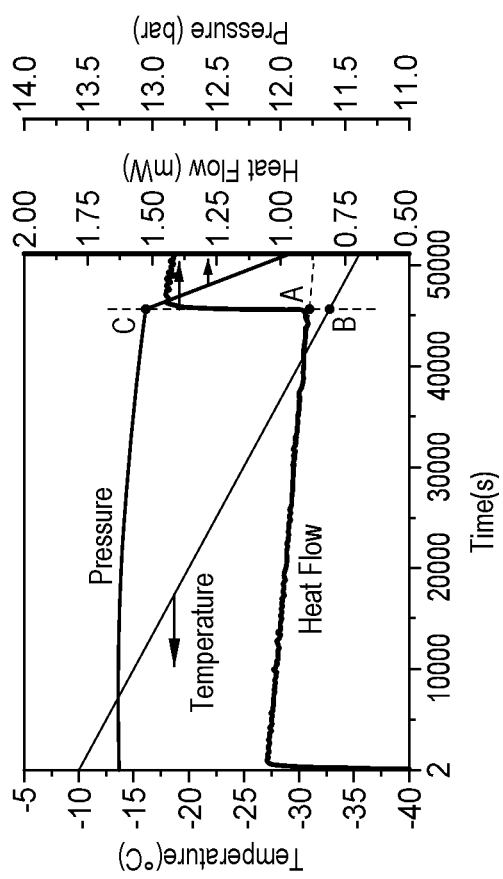
FIG. 2B shows example vapor pressure measurements of $CO_2$ and a comparative vapor pressure measurement of $CO_2$ according to at least one embodiment of the present disclosure.

FIG. 2B shows the result of four individual measurements of vapor pressures of $CO_2$, Examples 1-4, measured using the isochoric dew-point measurement method described herein relative to a comparative data set, Comparative 1. The cooling paths of the experiments, which are the isochores, are also shown. The four isochoric dew-point measurements were varied by the initial pressure at which the $CO_2$ was introduced into the sample cell. The comparative data set is data from the National Institute of Standards and Technology (NIST). The NIST data set is the result of critical evaluations of data obtained by several different sources which have been fitted to a mathematical function. FIG. 2B demonstrates that the vapor pressures obtained using the isochoric dew-point measurements are in excellent agreement with the comparative NIST data, with an average absolute deviation of less than about 1%.

Operators using conventional isobaric methods, such as the isobaric method described in ASTM E1782, would be unable to measure (or, at the very least, would have great difficulty in measuring) the vapor pressure of substances, such as $CO_2$, for at least the reason that finding an inert gas (or non-reactive gas) that dissolves only sparingly in $CO_2$ is challenging. The inert or non-reactive gas is added to the sample cell for typical isobaric methods in order to maintain the pressure in the sample cell. Furthermore, substances such as $CO_2$ are volatile, or even highly volatile. Further difficulties in typical isobaric measurements are encountered when determining several measurement parameters, e.g., the size of the test sample and the size of the pinhole, both of which should also be optimized together with the scanning rate (the heating/cooling rate). When these parameters are not optimized, the baseline of the thermogram becomes unclear and the measurements are not accurate. In contrast, the isochoric measurements described herein can eliminate most, if not all, of these difficulties. The baseline of the thermogram generated is also clear and the onset of the phase transition can be determined easily.

Figure 3:
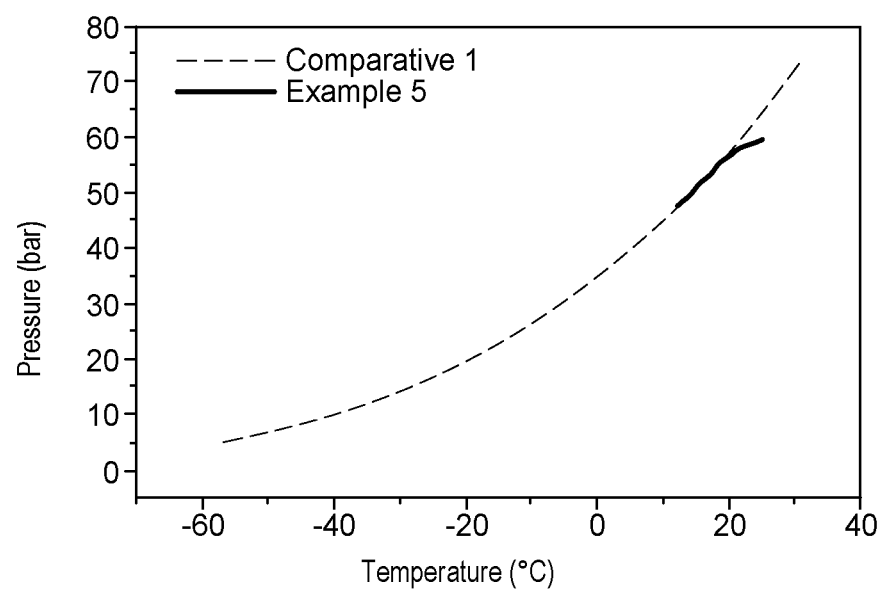
FIG. 3 shows an example continuous measurement of the vapor pressure of $CO_2$ relative to comparative data according to at least one embodiment of the present disclosure.

The isochoric dew-point measurement method described herein can also be used to determine the vapor pressure curve of a substance in one continuous experiment. For the continuous measurements, the cooling process of the sample is continued after condensation has occurred. FIG. 3 shows the results from the a continuous isochoric dew-point measurement of the vapor pressure curve of $CO_2$, Example 5, relative to Comparative 1. Proper selection of the scanning rate can ensure that equilibrium conditions can be achieved and/or maintained at points during the cooling process. After reaching the dew point, the vapor remains in equilibrium with the liquid upon further cooling, as drop by drop of liquid forms, provided the cooling rate is so low (such as less than 0.1° C./min) that equilibrium conditions can be achieved and/or maintained at points during the cooling process. For the measurements shown in FIG. 3, the cooling rate is about 0.03° C./min. With a cooling rate of 0.03° C./min, equilibrium conditions can be achieved at any point during the cooling process. FIG. 3 demonstrates that if equilibrium conditions can be achieved at a point during the cooling process, the vapor-pressure curve can be generated continuously. The isochoric process can be stopped at specified temperatures which can enable the measurement of vapor pressure at a certain temperature.

Dew Points of a Methane/Ethane Gas Mixture

Figure 4A:
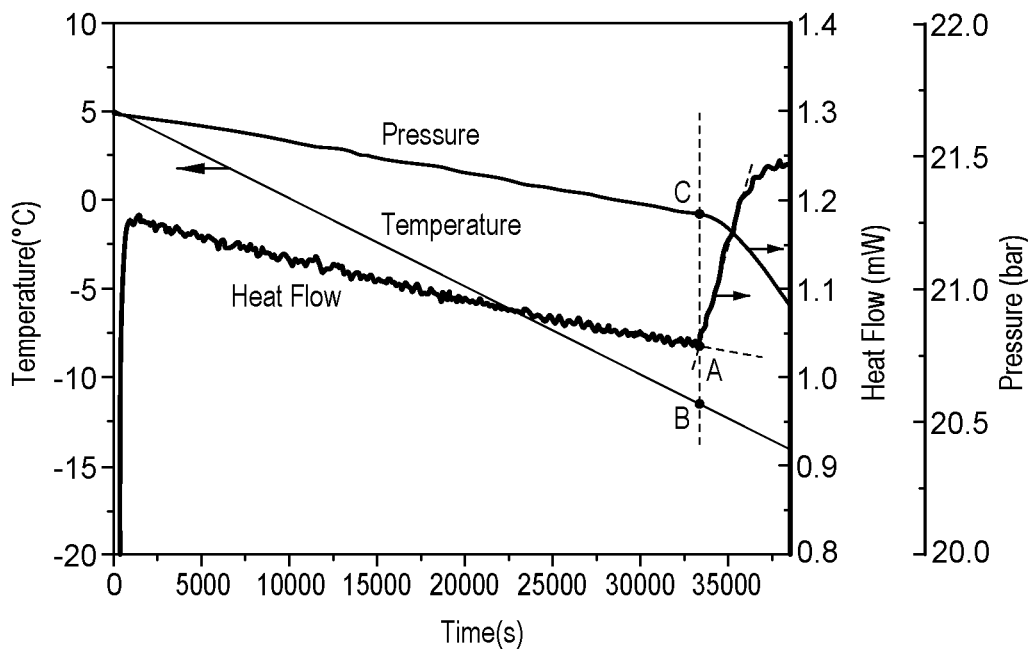
FIG. 4A is an example thermogram and pressure history of a dew point measurement of a methane/ethane gas mixture according to at least one embodiment of the present disclosure.

Dew points at different pressures or temperatures for a methane/ethane ($CH_4/C_2H_6$) gas mixture (about 15±0.3% $CH_4$ and 85±0.3% $C_2H_6$) are measured using the isochoric dew-point measurement. A typical thermogram of this dew-point measurement is shown in FIG. 4A. The onset condition of the phase transition is determined from the intersection point between the baseline and the tangent line (the dashed line) of the rising part of the exothermic peak (point A). The dew-point temperature (point B) and dew-point pressure (point C) can be determined by drawing a vertical line through point A.

Figure 4B:
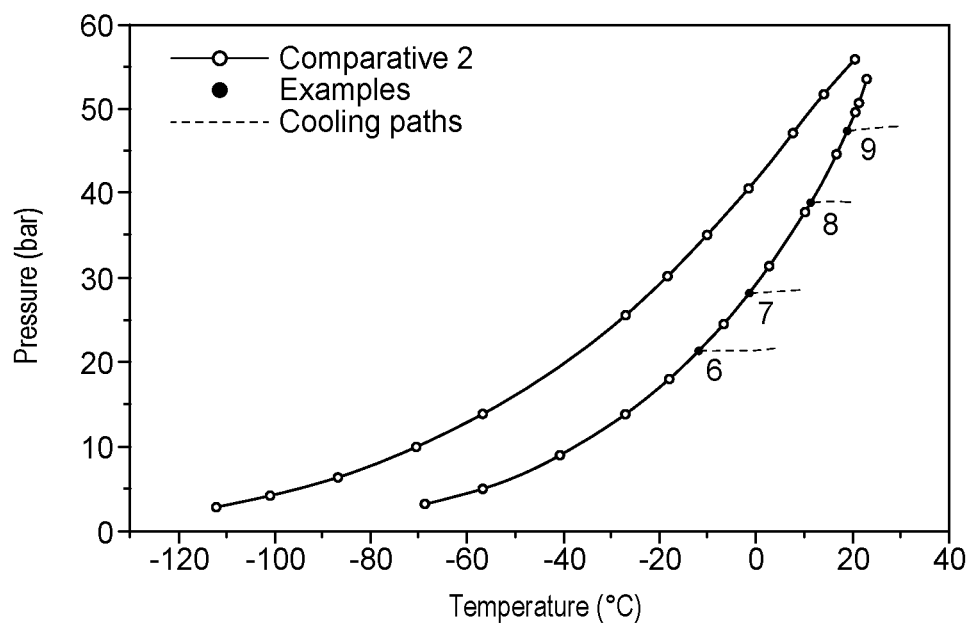
FIG. 4B shows example dew point measurements of a methane/ethane gas mixture and a comparative dew point measurements of a methane/ethane gas mixture according to at least one embodiment of the present disclosure.

FIG. 4B shows the data obtained for the dew points of four individual measurements of the methane/ethane gas mixture using the isochoric dew-point measurement method described herein, Examples 6-9, relative to comparative data, Comparative 2. The cooling paths of the experiments are also shown. The four isochoric dew-point measurements were varied by the initial pressure at which the methane/ethane gas mixture was introduced into the sample cell. The comparative data is on a gas mixture of 14.98% methane and 85.02% ethane. The data obtained by the isochoric method described herein is in excellent agreement with the comparative data. The experimental error of the comparative data is ±0.136 bar or ±0.167° C., whichever is larger, if the methane/ethane composition is considered exact. Neglecting the errors of the comparative data and using the comparative data as the standard values, the average absolute deviation of dew-point pressures measured by the isochoric method described herein is about 1.36%. By considering the uncertainty of the gas composition used for the isochoric measurements and the accuracy of the pressure transducer of the DSC apparatus, the error in the dew-point pressure of the isochoric measurements is estimated to be about ±0.25 bar. Although the method is demonstrated for a binary gas mixture, it can be used to measure the dew points of gas mixtures comprising two or more gases.

The isochoric dew-point measurement, in which the occurrence of the first drop of liquid phase is determined during a cooling isochoric process, is used to measure the vapor pressures of pure substances (e.g., $CO_2$) at different boiling temperatures and the dew points of a methane/ethane gas mixture at different pressures or temperatures.

The isochoric method is therefore demonstrated to be superior to the conventional isobaric method for phase-transition measurements using DSC. In all of these isochoric methods, there is no need to determine several measurement parameters usually encountered in the isobaric method, e.g., the size of the test sample, the size of the pinhole, and the associated scanning rate. The baseline of the thermogram generated is also clear and the onset of the phase transition can be determined easily. The isochoric method can be used to measure the onset of vapor-liquid phase transition for a wide range of substances and mixtures, including the ones for which the isobaric method is inapplicable. Conventional isobaric methods are unable to measure the dew points of the gaseous system because, e.g., the gases may escape through the pinhole of the sample cell leading to altered compositional profiles. This can lead to altered composition profiles. In contrast, the isochoric method described herein can be used to measure the gas system and the measurements are more accurate than conventional methods to measure gas systems.

B. Measuring the Onset of the Vapor-Liquid Phase Transition in Nanopores—Isochoric Dew-Point Measurement SBA-15 mesoporous silica is used as a non-limiting example of an adsorbent to test the isochoric method described herein. SBA-15 with three different pore diameters, S1, S2, and S3, were purchased and used without further treatment. Properties of SBA-15 samples are shown in Table 1.

TABLE 1

| Sample | $S_{BET}$ (m²/g) | $V_{total}$ (cm³/g) | $D_{BJH}$ (nm) |
|---|---|---|---|
| S1 | 746.7 | 0.738 | 3.408 |
| S2 | 803.1 | 0.859 | 4.892 |
| S3 | 772.6 | 1.202 | 6.563 |

Capillary Condensation Measurements of $CO_2$ in SBA-15

Figure 5A:
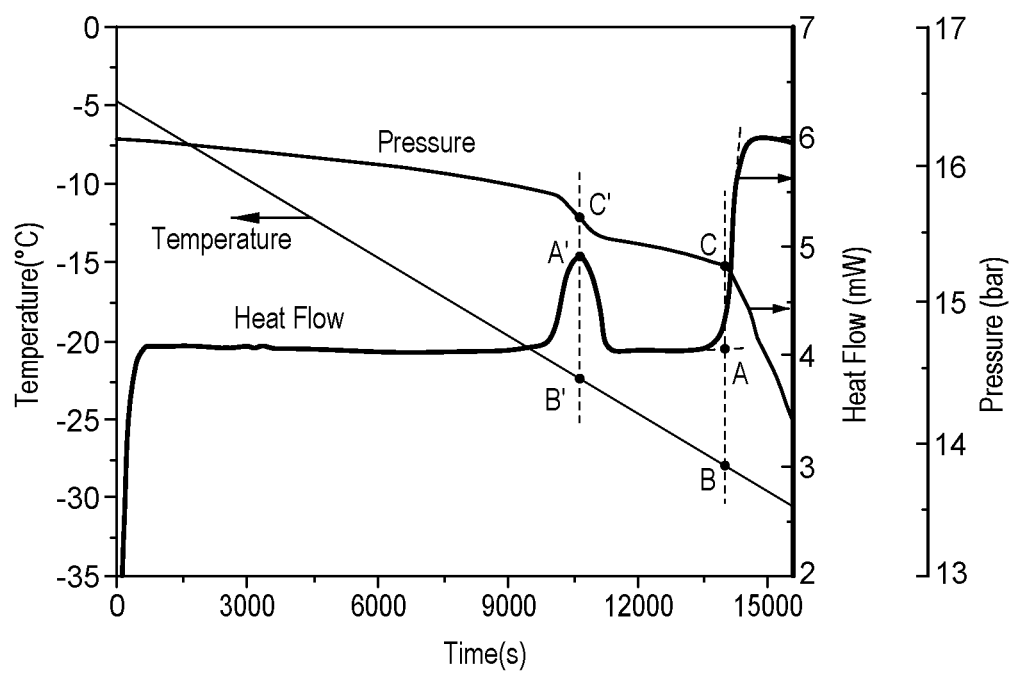
FIG. 5A is an example thermogram and pressure history for the capillary condensation of $CO_2$ in SBA-15 and the bulk condensation of $CO_2$ according to at least one embodiment of the present disclosure.

The capillary condensation of $CO_2$ in the SBA-15 mesoporous silica samples is measured using the isochoric dew-point measurement method described herein. FIG. 5A shows an example thermogram and pressure history of the capillary condensation of $CO_2$ in SBA-15 as well as the bulk condensation of $CO_2$. The thermogram shows a small exothermic peak due to the phase transition of $CO_2$ occurring in the pores and a larger exothermic peak due to the bulk condensation of $CO_2$. Before the phase transition occurs in the pores, the pressure of the test vessel decreases gradually because of the decreasing temperature present in the closed system. When condensation occurs within the pores, heat is released from the test sample, leading to a small exothermic peak in the heat flow curve, and the pressure of the system decreases more quickly to a lower level. As the cooling process continues, the pressure decreases gradually due to the decreasing temperature in the system. When the bulk condensation eventually starts to occur, the pressure again drops faster and at the same time a larger amount of heat is released, leading to a sharp increase of the heat flow curve. Along a cooling path, the phase transition of confined fluids in nanopores is encountered first before that of the bulk fluid. Notably, the isochoric dew-point procedure is able to measure both capillary and bulk condensation in a single run.

The onset condition of the bulk phase transition can be determined from the intersection point between the baseline and the tangent line (the dashed line) of the rising part of the exothermic peak (point A). The condensation temperature (point B) and vapor pressure (point C) can be determined by drawing a vertical line through point A.

To determine the onset condition for capillary condensation, unlike the determination of the onset condition of the bulk phase transition, one does not take the intersection point between the heat flow baseline and the tangent line of the rising part of the peak to define the capillary condensation because such an intersection point gives the conditions of condensation that occurs in the smallest mesopores only, not the entire mesopores that have an effective diameter corresponding to the peak of pore size distribution, $D_{BJH}$. Instead, the onset condition of the capillary condensation is determined by drawing a vertical dashed line that intersects the maximum of the thermogram peak (point A'), the temperature history, and the pressure history, which provides the condensation temperature (point B') and vapor pressure (point C') of the condensation. The maximum of this thermogram peak occurs simultaneously with the largest time rate of change of the system pressure during the capillary condensation, which indicates that with the amount of adsorbent and cooling rate used, there is no apparent time lag between the heat flow and pressure measurements. Since the temperature and pressure measurements are done using different devices, this is shows that the measurements of temperature and pressure of the phase transition are accurate. Temperature is measured by the temperature sensor of the DSC, while pressure is measured by using a pressure sensor outside the DSC.

Figure 5B:
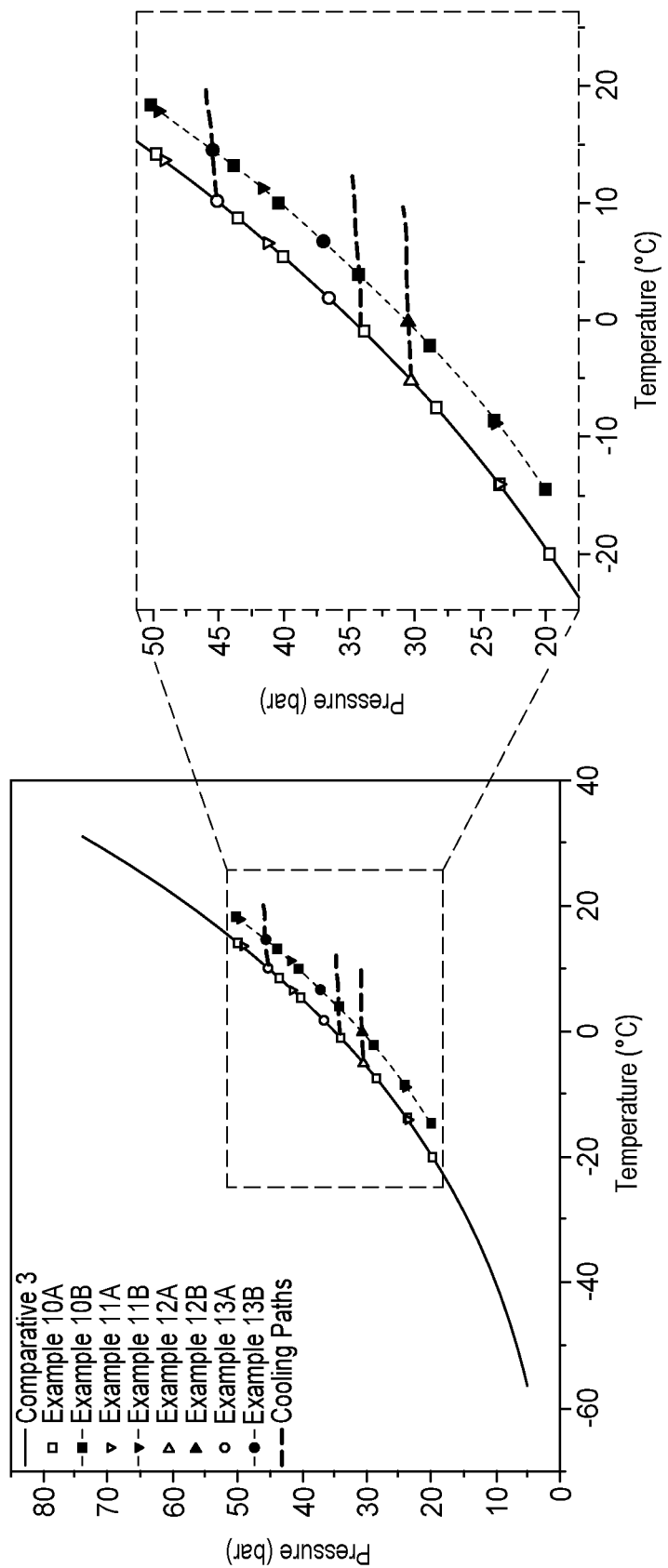
FIG. 5B shows example and comparative capillary condensation measurements and bulk condensation measurements of $CO_2$ according to at least one embodiment of the present disclosure.

The effect of scanning rate on the isochoric measurements in the presence of the adsorbent, S3, is shown in FIG. 5B. Table 2 shows certain conditions for the four isochoric experiments in FIG. 5B. Only four isochoric experiments are needed since the procedure can measure the bulk phase transition (Examples 10A, 11A, 12A, and 13A) simultaneously with that of the confined fluid (Examples 10B, 11B, 12B, and 13B).

TABLE 2

| Example | Amount of Adsorbent S3 (mg) | Scanning Rate (° C./min) |
|---|---|---|
| 10A, 10B | 7.5 | 0.1 |
| 11A, 11B | 3 | 0.1 |
| 12A, 12B | 1 | 0.1 |
| 13A, 13B | 7.5 | 0.03 |

In FIG. 5B, the dashed lines are added to trace an example capillary condensation curve, and the cooling paths are shown only for some measurements. Measurements with S3 using two different cooling rates—0.1° C./min and 0.03° C./min—show that the measured vapor pressures of bulk $CO_2$ are in agreement with the comparative NIST data, Comparative 3, and the measured conditions for capillary condensation are consistent and fall on the same curve. Note that the ability of the procedure to measure the bulk phase transition provides a robust way of verifying the accuracy of the measurements. The data also shows that a higher scanning rate of 0.1° C./min can be used for faster measurements.

The effect of the amount of adsorbent used on the isochoric measurements is also shown in FIG. 5B. FIG. 5B shows that the amount of adsorbent can have little to no effect on the capillary condensation of $CO_2$. As shown below, a different conclusion can be reached for the capillary condensation of gas mixtures.

Figure 5C:
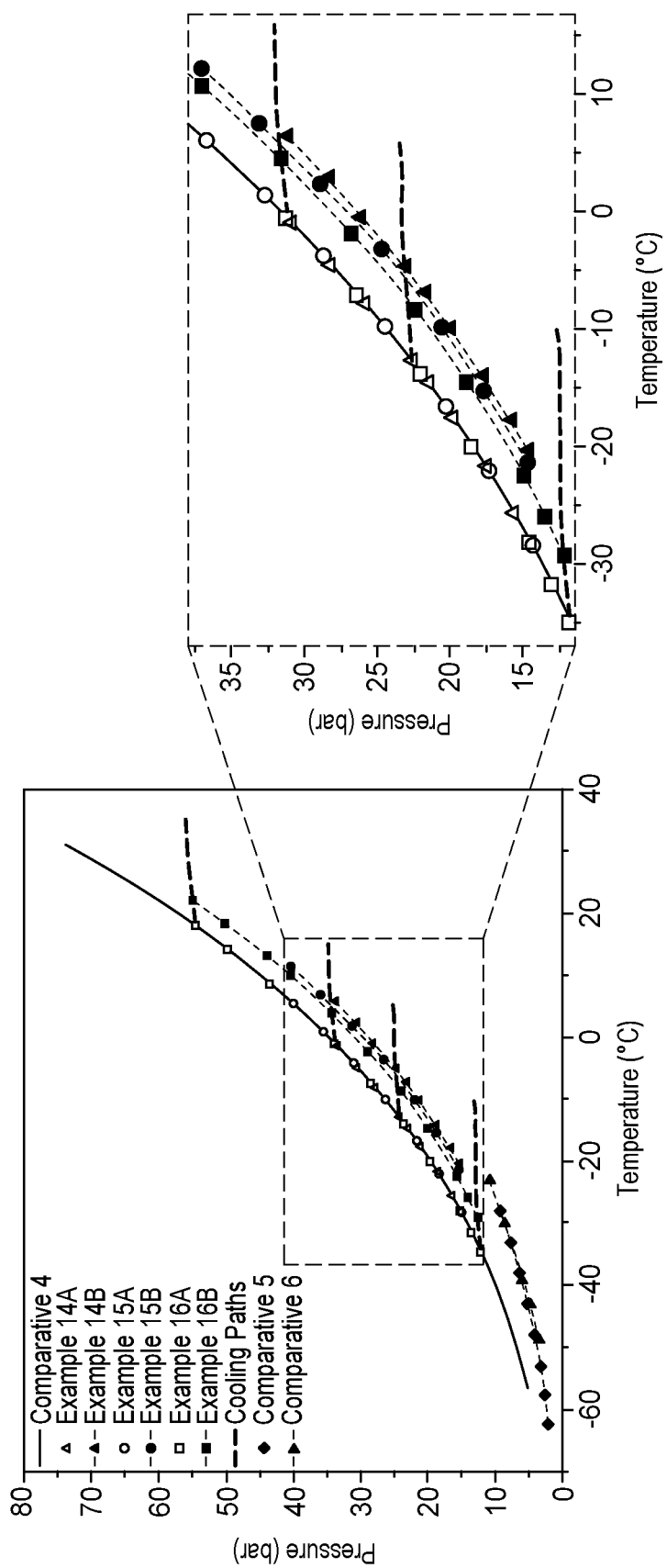
FIG. 5C shows example and comparative capillary condensation measurements and bulk condensation measurements of $CO_2$ according to at least one embodiment of the present disclosure.

FIG. 5C shows the results of the isochoric dew-point measurements of the capillary condensation in SBA-15 samples and bulk condensation of $CO_2$ relative to comparative data. The comparatives are NIST data (Comparative 4) and data from the capillary condensation of $CO_2$ in MCM-41 (4.4 nm and 3.7 nm) (Comparatives 5 and 6). Table 3 shows certain conditions for the three isochoric experiments in FIG. 5C. Only three isochoric experiments are needed since the procedure can measure the bulk phase transition (Examples 14A, 15A, and 16A) simultaneously with that of the confined fluid (Examples 14B, 15B, and 16B).

TABLE 3

| Example | Type of Adsorbent | Amount of Adsorbent (mg) | Scanning Rate (° C./min) |
|---|---|---|---|
| 14A, 14B | S1 | 7.5 | 0.1 |
| 15A, 15B | S2 | 7.5 | 0.1 |
| 16A, 16B | S3 | 7.5 | 0.1 |

In FIG. 5C, the dashed lines are added to trace an example capillary condensation curve, and the cooling paths are shown only for some measurements for clarity. The bulk vapor pressures obtained using the isochoric dew-point measurements described herein are in excellent agreement with the NIST data. The measurements demonstrate that the phase transition in the pores happens at a higher temperature than that in the bulk on a cooling path. These results also confirm that the phase transition curve of fluids confined in a smaller pore is below that in a larger pore on the phase diagram. The capillary condensation in SBA-15 is different from that of MCM-41. Although not wishing to be bound by any theory, the difference may be attributed to the existence of micropores in SBA-15.

Dew Point Measurements of a Methane/Ethane Gas Mixture in SBA-15

Figure 6A:
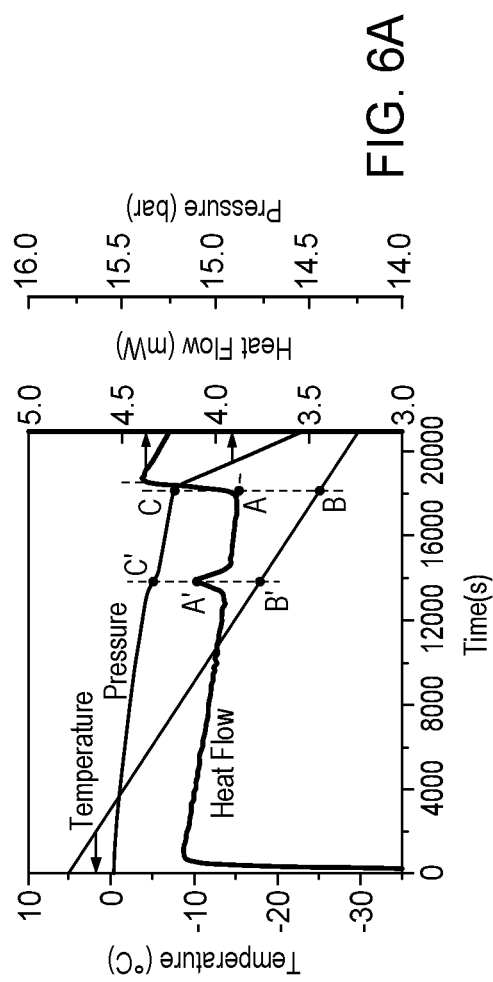
FIG. 6A is an example thermogram and pressure history for the capillary condensation of a methane/ethane gas mixture in SBA-15 and the bulk condensation of the methane/ethane gas mixture according to at least one embodiment of the present disclosure.

The same isochoric procedure as that for pure fluids is applied to measure the dew points of a methane/ethane gas mixture in nanopores at a bulk composition of about 15±0.3% $CH_4$/85±0.3% $C_2H_6$. FIG. 6A shows an example thermogram of the capillary condensation and bulk condensation of the gas mixture for such a measurement. The thermogram analysis of this dew-point measurement is also the same as that of capillary condensation measurement of $CO_2$. Because the real composition of the gas mixture in the pores cannot be measured, it is common practice to report the measureable conditions of the confined phase transition based on the composition of the bulk mixture surrounding the pores.

Thus, the dew point of the confined mixture here is defined as the onset of phase transition in the pores at a fixed composition of the surrounding bulk gas mixture.

The onset condition of the bulk phase transition can be determined from the intersection point between the baseline and the tangent line (the dashed line) of the rising part of the exothermic peak (point A). The dew-point temperature (point B) and dew-point pressure (point C) can be determined by drawing a vertical line through point A. The onset condition for capillary condensation is determined by drawing a vertical dashed line that intersects the maximum of the thermogram peak (point A'), the temperature history, and the pressure history, which provides the dew-point temperature (point B') and dew-point pressure (point C') of the condensation.

It is well known that the presence of nanopores may alter the bulk gas composition by selective adsorption. Hence, the measured phase transition in the pores would not represent that of confined mixture surrounded by a bulk having the initial composition. The experiments are set up to make the bulk composition change before and after the capillary condensation negligible so that the subsequent bulk condensation that occurs upon further cooling can be compared with that of the bulk without the adsorbent. A match between them provides evidence that the bulk composition is effectively unchanged. One way to minimize the alteration of the bulk composition is to employ a small amount of the adsorbent. The suitable amount of adsorbent is system-specific, varying for different fluids and different adsorbents. If a relatively large amount of adsorbent is used, the thermogram peak of the dew point of gas mixture in pores can be higher, and easy to identify, but the bulk gas composition can significantly change because of the selective adsorption in the pores during the cooling process. On the other hand, if a smaller amount of adsorbent is used, the change in bulk gas composition is negligible, but the thermogram peak might not be detectable. Therefore, an amount of adsorbent can be selected such that it introduce both detectable thermogram peak and negligible change in bulk composition.

Figure 6B:
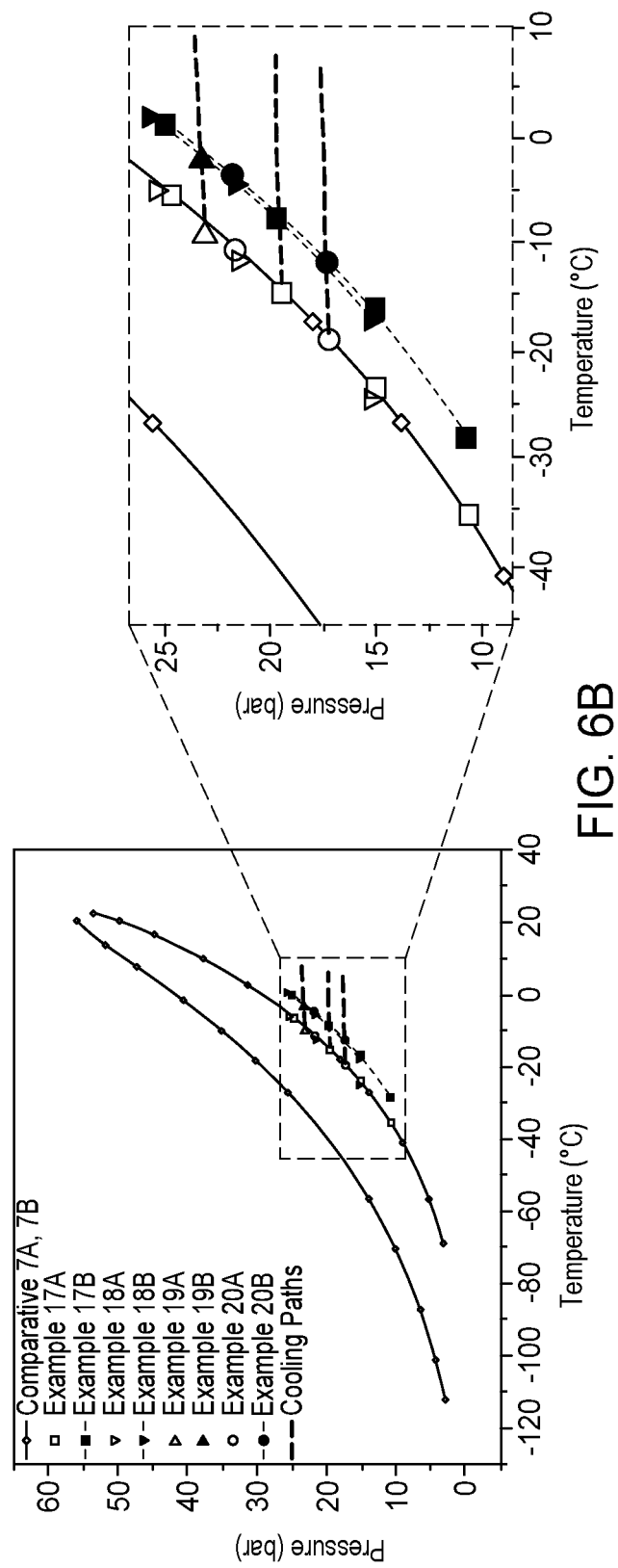
FIG. 6B shows example and comparative capillary condensation measurements and bulk condensation measurements of a methane/ethane gas mixture in SBA-15 according to at least one embodiment of the present disclosure.

FIG. 6B shows the effect of the amount of S3 adsorbent used on the measured dew points of the confined and bulk methane/ethane gas mixtures (15±0.3% $CH_4$/85±0.3% $C_2H_6$) for various examples. Comparative data, Comparative 7, for bulk bubble points and dew points of a gas mixture (14.98% methane and 85.02% ethane) is also shown. Table 4 shows certain conditions for the four isochoric experiments in FIG. 6B. Four isochoric experiments are utilized since the procedure can measure the bulk phase transition (Examples 17A, 18A, 19A, and 20A) simultaneously with that of the confined fluid (Examples 17B, 18B, 19B, and 20B).

TABLE 4

| Example | Amount of Adsorbent S3 (mg) | Scanning Rate (° C./min) |
| --- | --- | --- |
| 17A, 17B | 1.3 | 0.1 |
| 18A, 18B | 2.5 | 0.1 |
| 19A, 19B | 7 | 0.1 |
| 20A, 20B | 1.3 | 0.03 |

In FIG. 6B, the dashed lines are added to trace an example capillary condensation curve, and the cooling paths are shown only for some measurements for clarity. Even an adsorbent amount as little as about 2.5 mg changes the bulk gas composition appreciably. The presence of nanopores shifts the measured bulk dew points to lower temperatures because ethane is preferentially adsorbed during the process, and the measured dew points of the confined mixtures do not represent those surrounded by the 15±0.3% $CH_4$/85±0.3% $C_2H_6$ bulk gas mixture. With about 1.3 mg of adsorbent, on the other hand, even after capillary condensation, the change in bulk gas composition is not noticeable, e.g., the original bulk dew points can still be reproduced. Therefore, about 1.3 mg of adsorbent is used to generate accurate data for S3. Similarly, accurate data can be generated by using adsorbent amounts of about 2.2 mg and about 2.0 mg for 51 and S2, respectively (not shown in Figure). Therefore, in the measurements of dew points of fluid mixtures in the pores, the change in the bulk gas composition due to selective adsorption and capillary condensation can be mitigated using a suitable amount of adsorbent that varies for different fluids and adsorbents.

FIG. 6B also shows the effects of scanning rate on the DSC measurements of dew points of the methane/ethane gas mixture in about 1.3 mg of S3. The bulk composition of the methane/ethane gas mixture is about 15±0.3% $CH_4$/85±0.3% $C_2H_6$. Measurements with S3 using two different cooling rates—0.1° C./min and 0.03° C./min—show that the measured bulk dew points fall on the dew-point curve obtained from comparative data. Similar to capillary condensation measurements of $CO_2$, a higher scanning rate of 0.1° C./min can be used for faster measurements.

Figure 6C:
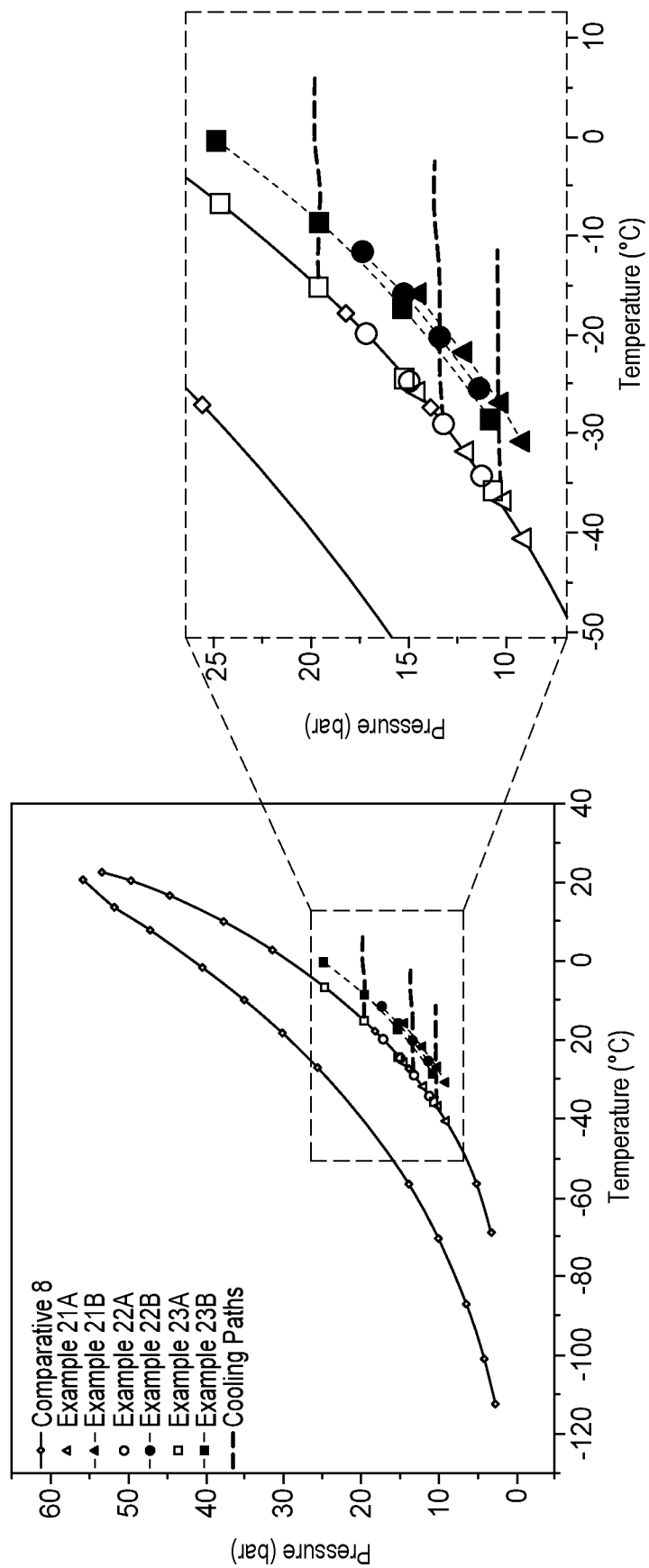
FIG. 6C shows example and comparative capillary condensation measurements and bulk condensation measurements of a methane/ethane gas mixture according to at least one embodiment of the present disclosure.

FIG. 6C shows the results of the dew-point measurements of the confined and bulk methane/ethane gas mixtures (15±0.3% $CH_4$/85±0.3% $C_2H_6$) for various examples. Comparative data, Comparative 8, is also shown. The comparative data of bulk bubble points and dew points are of a gas mixture (14.98% methane and 85.02% ethane) in adsorbent. Table 5 shows certain conditions for the four isochoric experiments in FIG. 6C. Three isochoric experiments are utilized since the procedure can measure the bulk phase transition (Examples 21A, 22A, and 23A) simultaneously with that of the confined fluid (Examples 21B, 22B, and 23B).

TABLE 5

| Example | Type of Adsorbent | Amount of Adsorbent (mg) | Scanning Rate (° C./min) |
| --- | --- | --- | --- |
| 21A, 21B | S1 | 2.2 | 0.1 |
| 22A, 22B | S2 | 2.0 | 0.1 |
| 23A, 23B | S3 | 1.3 | 0.1 |

In FIG. 6C, the dashed lines are added to trace an example capillary condensation curve, and the cooling paths are shown only for some measurements for clarity. Similar to the capillary condensation of pure fluids, the dew-point curve of fluid mixtures confined in nanopores is also below that of the surrounding bulk fluid, and the curve is even lower for smaller pores on the phase diagram. The results show that the phase transition boundaries of fluids in nanopores are below those of the bulk fluids and that the boundaries of fluids in a smaller pore are below those in a larger pore on the phase diagram.

The isochoric dew-point measurement method provides an efficient and accurate measurement of the phase transition of pure fluids and fluid mixtures in nanopores. In addition, the procedure enables the measurement of the bulk phase transition simultaneously with that of the confined fluids. The unique ability of the procedure to measure the bulk phase transition simultaneously with that of the confined fluids provides a robust way of verifying the accuracy of the measurements.

Figure 7A:
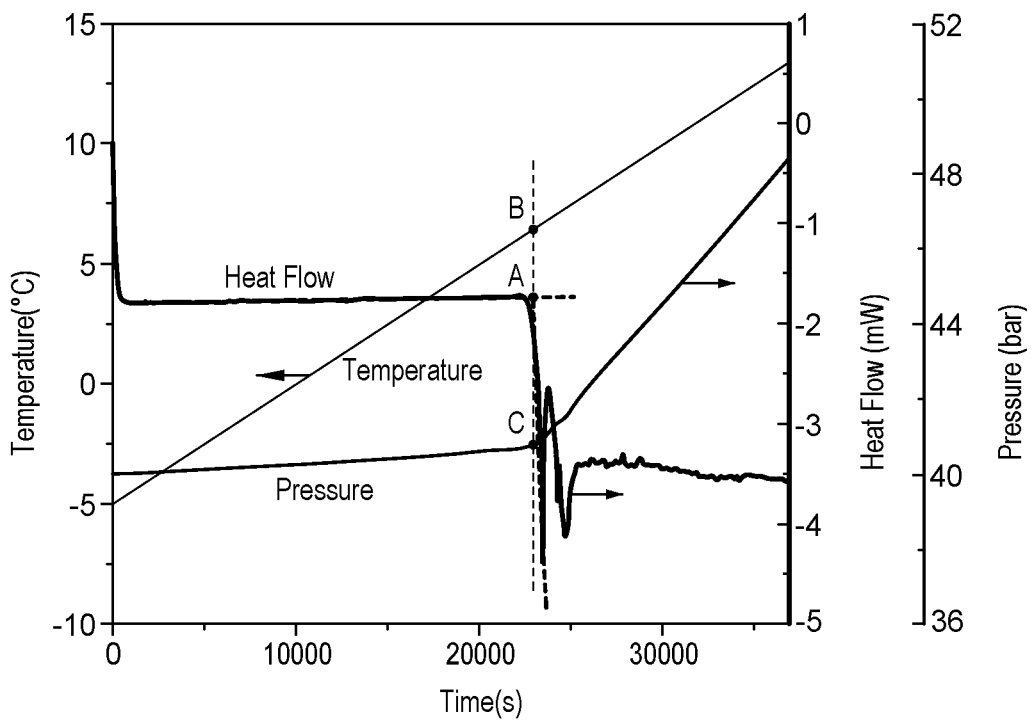
FIG. 7A is an example thermogram and pressure history of a $CO_2$ vapor pressure measurement according to at least one embodiment of the present disclosure.

C. Measuring the Onset of the Vapor-Liquid Phase Transition in Bulk—Isochoric Evaporation-Point Measurement An example thermogram of the measurement of the evaporation of $CO_2$ in the bulk phase using this isochoric evaporation-point measurement method, along with the pressure history, is shown in FIG. 7A. The temperature curve is a straight line with a constant slope throughout the process because a constant cooling rate can be used. The heat flow is at first stable, showing a flat baseline, and then the occurrence of a phase transition (evaporation) in the test vessel results in an endothermic peak in the heat flow due to the absorption of heat during the evaporation process. The system pressure increases gradually at first because of the temperature increase in the system and increases much faster after evaporation as a consequence of the additional vapor phase generated in the system. The slope change in the pressure curve corresponds to the abrupt fall in heat flow, which indicates that with the heating rate used, there is no apparent time lag between the heat flow and pressure measurement. The onset condition of evaporation is determined from the intersection between the baseline and the tangent line to the incline portion of the endothermic peak (Point A). The boiling temperature (Point B) and vapor pressure (Point C) can be determined by drawing a vertical line through point A.

Figure 7B:
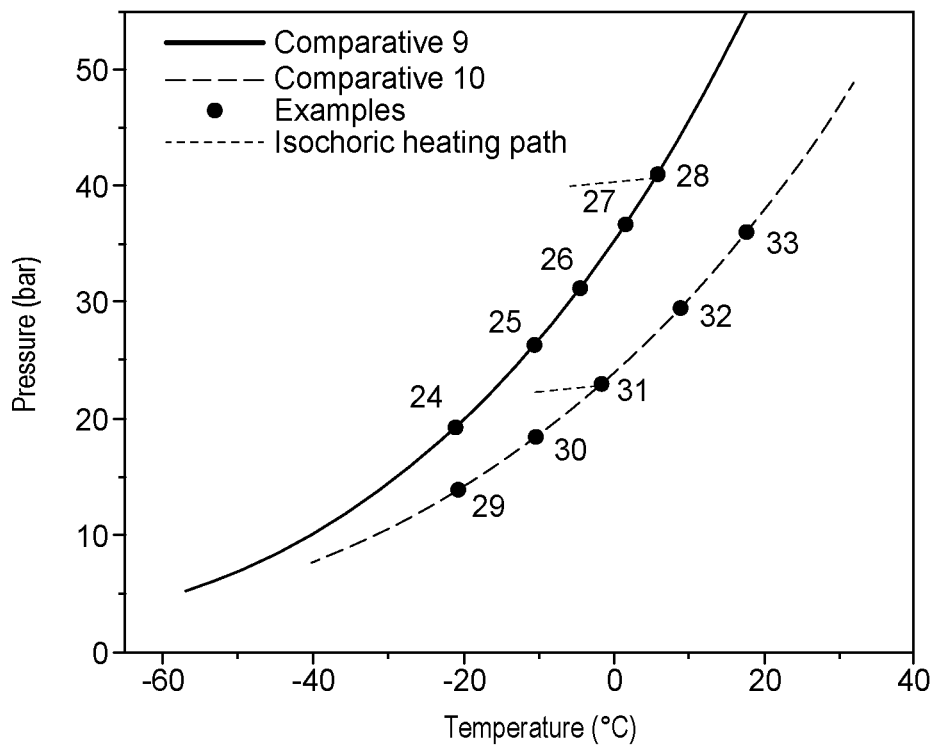
FIG. 7B shows example evaporation point measurements of $CO_2$ and ethane a comparative measurements of $CO_2$ and ethane according to at least one embodiment of the present disclosure.

FIG. 7B shows the result of five individual measurements of evaporation of $CO_2$ in the bulk phase, Examples 26-30, and ethane in the bulk phase, Examples 31-35, using the isochoric evaporation point measurement method described herein. FIG. 7B also shows a comparative data set, Comparative 9 and 10, for $CO_2$ and ethane, respectively. The heating paths of the experiments, which are the isochores, are also shown. The five isochoric dew-point measurements for each substance were varied by the initial pressure at which the $CO_2$ or ethane was introduced into the sample cell. The comparative data set is data from the National Institute of Standards and Technology (NIST). The NIST data set is the result of critical evaluations of data obtained by several different sources which have been fitted to a mathematical function. FIG. 7B demonstrates that the vapor pressures obtained using the isochoric dew-point measurements are in excellent agreement with the comparative NIST data, with an average absolute deviation of about 0.22% for $CO_2$ and about 0.5% for ethane. The errors of the temperature and pressure measurements are estimated to be about ±0.04° C. and about ±0.04 bar, respectively.

The isochoric evaporation-point method described herein overcomes those same hurdles described above presented by conventional isobaric methods (e.g., the ASTM method).

Figure 8A:
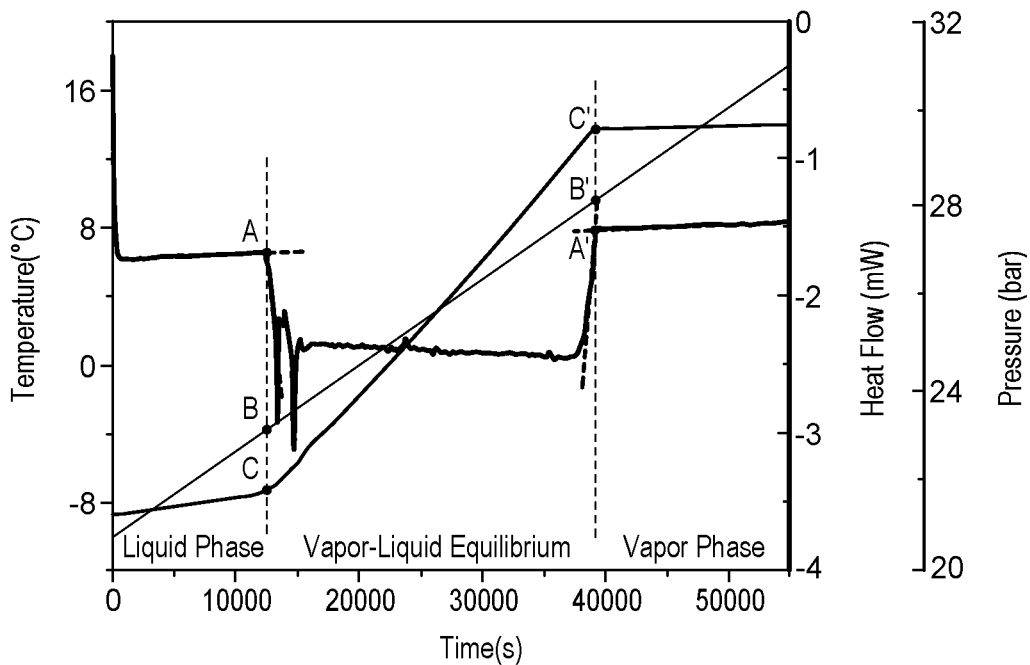
FIG. 8A shows an example thermogram of a continuous measurement of the vapor pressure of $CO_2$ relative according to at least one embodiment of the present disclosure.

The isochoric evaporation-point measurement method described herein can also be used to determine the vapor pressure curve of a substance in one continuous experiment. For the continuous measurements, the heating process of the sample is continued after the first bubble has occurred. The thermogram of such a continuous measurement is shown in FIG. 8A. The thermogram can be divided into three distinct stages separated by the two vertical dashed lines drawn in the figure. In the first stage, the fluid inside the test vessel is in a single liquid phase. With the increase of the system temperature, evaporation occurs in the test vessel at the left-side vertical dashed line, thus entering the second stage, i.e., vapor-liquid phase equilibrium. The pressure increases more quickly and heat flow deviates from the baseline in this stage. If the temperature is further increased, the system reaches the right-side vertical dashed line and enters the third stage, with the heat flow returning to the base line and the pressure increasing slower again, which indicates that the fluid inside the test cell has been evaporated and the system is in the vapor region.

Figure 8B:
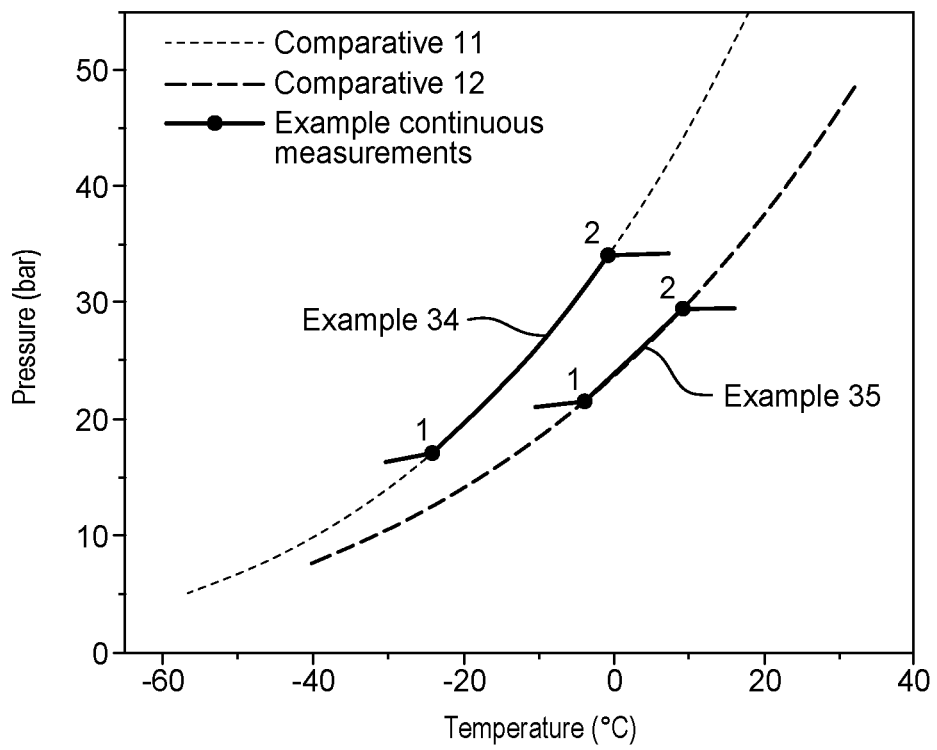
FIG. 8B shows an example continuous measurement of the vapor pressure of $CO_2$ and ethane relative to comparative data according to at least one embodiment of the present disclosure.

FIG. 8B shows the results of continuous measurements with $CO_2$ (Example 34) and ethane (Example 35) using the isochoric evaporation-point measurement method. Both measurements start in the liquid region. With the increase of the system temperature, the heating path hits the vapor pressure curve at Point 1, whose coordinate can be determined from Points B and C in FIG. 8A. Point 1 indicates the appearance of the first bubble of vapor in the liquid sample, namely the onset of evaporation. Then the heating path follows the vapor pressure curve continuously until all of the liquid in the test vessel is evaporated at Point 2. In other words, Point 2 indicates the disappearance of the last drop of liquid in the test vessel. The coordinate of Point 2 can be determined from Points B' and C' in FIG. 8A, with a procedure similar to the determination of Point 1. For the measurements shown in FIG. 8B, the cooling rate is about 0.03° C./min. With a cooling rate of 0.03° C./min, equilibrium conditions can be achieved at any point during the cooling process. FIG. 8B demonstrates that if equilibrium conditions can be achieved at any point during the heating process, the vapor pressure curve can be generated continuously. Of note, by adding the small glass bar into the test vessel, the distance between Points 1 and 2 can be effectively decreased, thus entering the vapor region at a lower temperature and pressure with the same initial conditions.

The isochoric method is therefore demonstrated to be superior to the conventional isobaric method for phase-transition measurements using DSC. In all of these isochoric methods, there is no need to determine several measurement parameters usually encountered in the isobaric method, e.g., the size of the test sample, the size of the pinhole, and the associated scanning rate. The baseline of the thermogram generated is also clear and the onset of the phase transition can be determined easily. The isochoric method can be used to measure the onset of vapor-liquid phase transition for a wide range of substances and mixtures, including the ones for which the isobaric method is inapplicable. Conventional isobaric methods are unable to measure the evaporation points of the volatile liquid system because, e.g., vapor may escape through the pinhole of the sample cell leading to unclear baseline in the thermogram. In contrast, the isochoric method described herein can be used to measure the volatile liquid system and the measurements are more accurate than conventional methods.

D. Measuring the Onset of the Vapor-Liquid Phase Transition in Nanopores—Isochoric Evaporation-Point Measurement The capillary evaporation of $CO_2$ and ethane in two different pore sizes of SBA-15, adsorbent S2 and S3, is measured using the isochoric evaporation-point measurement method described herein.

Figure 9A:
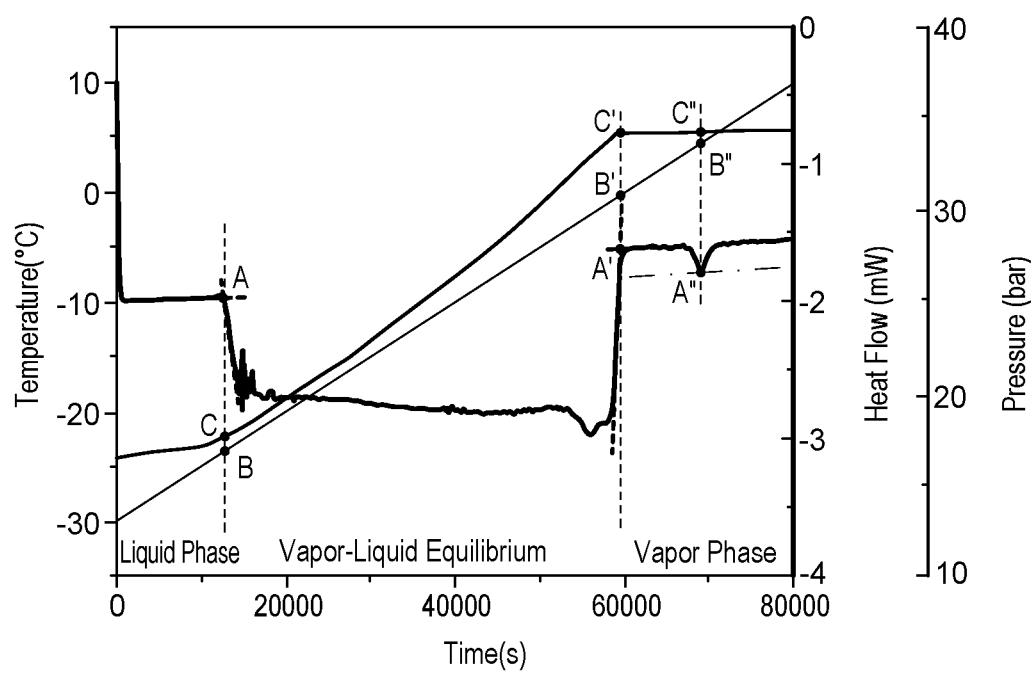
FIG. 9A is an example thermogram and pressure history for the capillary evaporation of $CO_2$ in SBA-15 according to at least one embodiment of the present disclosure.

FIG. 9A shows an example thermogram and pressure history of the measurement of capillary evaporation of $CO_2$ in nanoporous media. FIG. 9A is similar to FIG. 8A, except that a small endothermic peak in the heat flow due to capillary evaporation of fluid in the nanoporous media. This small peak is located in the vapor region of the bulk fluid, which can indicate that capillary evaporation occurs after all of the liquid outside the pore, namely in the bulk phase, has been evaporated. In other words, evaporation inside the pore should occur at a higher temperature (isobarically) or a lower pressure (isothermally), and be independent of the evaporation outside the pore. The capillary evaporation point is determined using a similar procedure as the determination of capillary condensation described above. Specifically, a line parallel to the heat flow baseline, which is tangent to the endothermic peak at Point A", is drawn (dotted line in FIG. 9A). Then drawing a vertical dashed line that passes through Point A" provides the temperature (Point B") and pressure (Point C") of capillary evaporation.

FIGS. 9B-9E shows the results of the isochoric evaporation-point measurement method of the confined and bulk $CO_2$ and ethane in the presence of adsorbent S2 and adsorbent S3. For comparison, experimental data of capillary condensation obtained for the same system (adsorbent+adsorbate) is included as well as comparative NIST data. Table 6 shows these examples and comparatives. The isochoric evaporation-point measurement method can measure the bulk phase transition (Examples 36A-51A) simultaneously with that of the confined fluid (Examples 36B-51B).

TABLE 6

| Example | Substance | Type of Adsorbent | Amount of Adsorbent (mg) | Scanning Rate (° C./min) |
|---|---|---|---|---|
| Comparative 13 | $CO_2$ | — | — | — |
| Comparative 14 | $CO_2$ | S2 | 7.5 | 0.1 |
| 36A, 36B | $CO_2$ | S2 | 12.0 | 0.03 |
| 37A, 37B | $CO_2$ | S2 | 12.0 | 0.03 |
| 38A, 39B | $CO_2$ | S2 | 12.0 | 0.03 |
| 39A, 39B | $CO_2$ | S2 | 12.0 | 0.03 |
| Comparative 15 | $C_2H_6$ | — | — | — |
| Comparative 16 | $C_2H_6$ | S2 | 7.5 | 0.1 |
| 40A, 40B | $C_2H_6$ | S2 | 12.0 | 0.03 |
| 41A, 41B | $C_2H_6$ | S2 | 12.0 | 0.03 |
| 42A, 42B | $C_2H_6$ | S2 | 12.0 | 0.03 |
| 43A, 43B | $C_2H_6$ | S2 | 12.0 | 0.03 |
| Comparative 17 | $CO_2$ | — | — | — |
| Comparative 18 | $CO_2$ | S3 | 7.5 | 0.1 |
| 44A, 44B | $CO_2$ | S3 | 8.0 | 0.03 |
| 45A, 45B | $CO_2$ | S3 | 8.0 | 0.03 |
| 46A, 46B | $CO_2$ | S3 | 8.0 | 0.03 |
| 47A, 47B | $CO_2$ | S3 | 8.0 | 0.03 |
| Comparative 19 | $C_2H_6$ | — | — | — |
| Comparative 20 | $C_2H_6$ | S3 | 7.5 | 0.1 |
| 48A, 48B | $C_2H_6$ | S3 | 8.0 | 0.03 |
| 49A, 49B | $C_2H_6$ | S3 | 8.0 | 0.03 |
| 50A, 50B | $C_2H_6$ | S3 | 8.0 | 0.03 |
| 51A, 51B | $C_2H_6$ | S3 | 8.0 | 0.03 |

Comparatives 13, 15, 17, and 19 are NIST data without an adsorbent. Comparatives 14, 16, 18, and 20 are capillary condensation data obtained from the isochoric dew-point measurement method described herein.

Figure 9B:
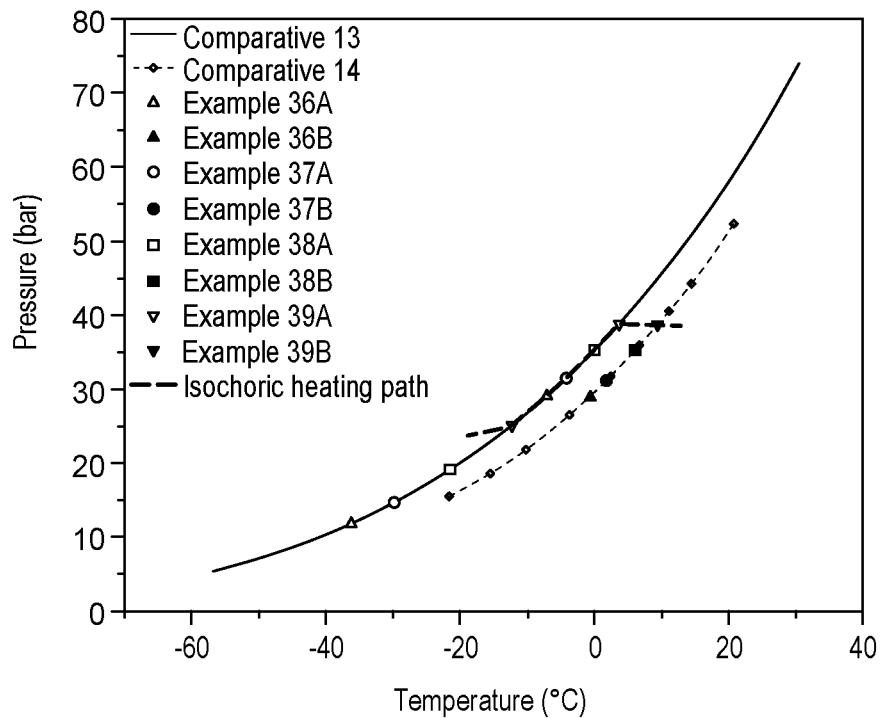
FIG. 9B shows example capillary evaporation measurements and bulk evaporation measurements of $CO_2$ in SBA-15 (adsorbent S2) according to at least one embodiment of the present disclosure.
Figure 9C:
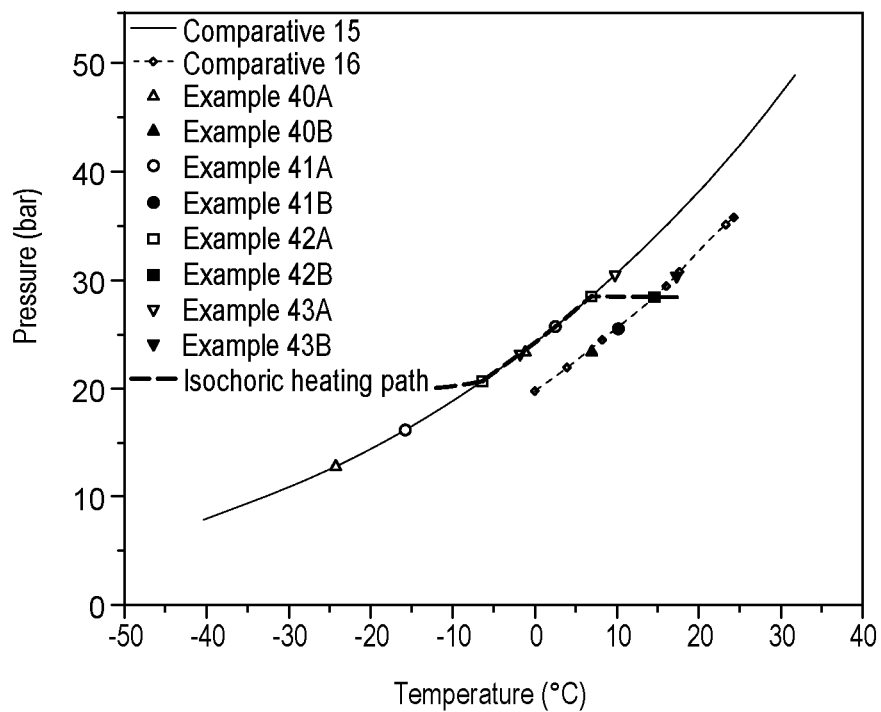
FIG. 9C shows example capillary evaporation measurements and bulk evaporation measurements of ethane in SBA-15 (adsorbent S2) according to at least one embodiment of the present disclosure.
Figure 9D:
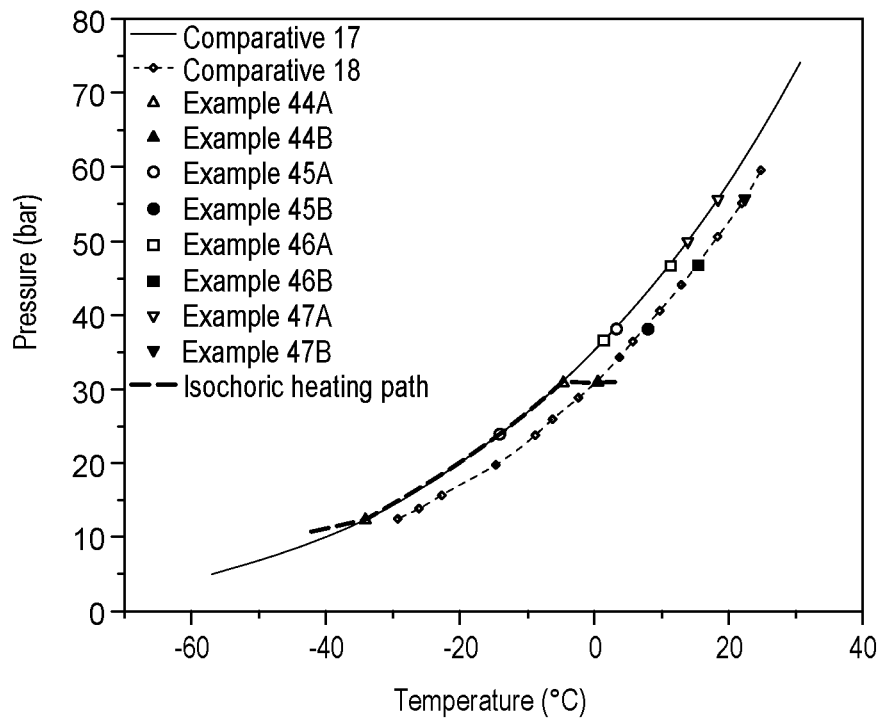
FIG. 9D shows example capillary evaporation measurements and bulk evaporation measurements of $CO_2$ in SBA-15 (adsorbent S3) according to at least one embodiment of the present disclosure.
Figure 9E:
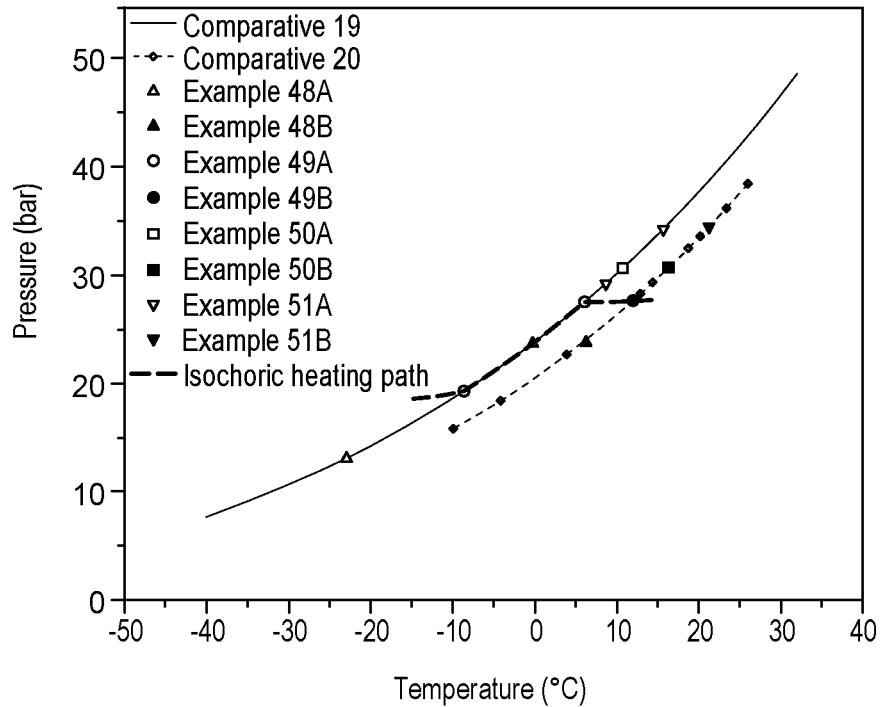
FIG. 9E shows example capillary evaporation measurements and bulk evaporation measurements of ethane in SBA-15 (adsorbent S3) according to at least one embodiment of the present disclosure.
Figure 10:
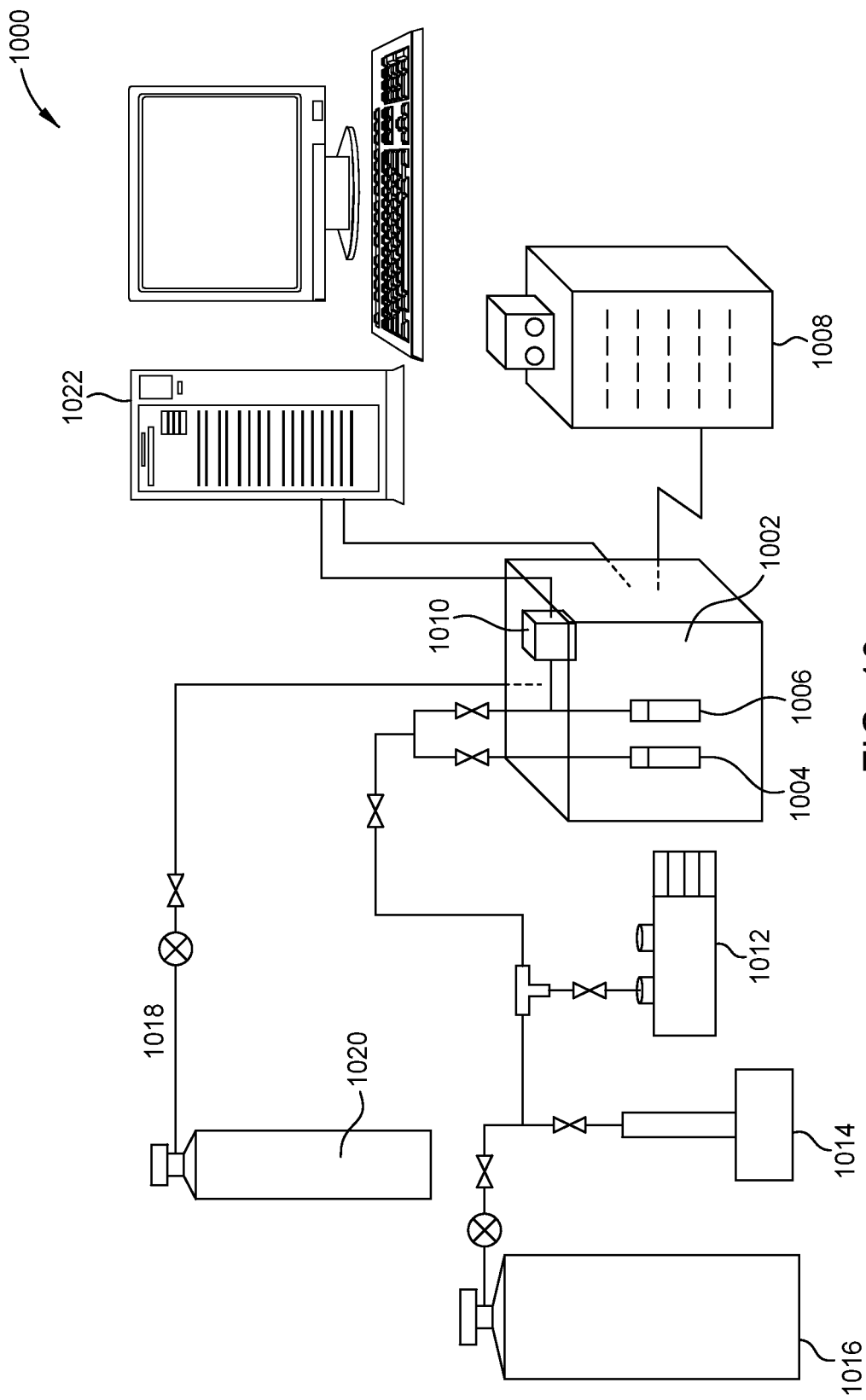
FIG. 10 shows an example apparatus used to determine the vapor-liquid phase transitions according to at least one embodiment of the present disclosure.

The example capillary evaporation measurements and bulk evaporation measurements of $CO_2$ in SBA-15 (adsorbent S2) are shown in FIG. 9B, and the example capillary evaporation measurements and bulk evaporation measurements of ethane in SBA-15 (adsorbent S2) is shown in FIG. 9C. The example capillary evaporation measurements and bulk evaporation measurements of $CO_2$ in SBA-15 (adsorbent S3) is shown in FIG. 9D, and the example capillary evaporation measurements and bulk evaporation measurements of ethane in SBA-15 (adsorbent S3) is shown in FIG. 9E. In FIGS. 9B-9E, the dashed lines are added to trace an example capillary evaporation curve, and the heating paths of one test are shown for clarity. The results show that the phase transition boundaries of fluids in nanopores are below those of the bulk fluids and that the boundaries of fluids in a smaller pore are below those in a larger pore on the phase diagram.

The isochoric evaporation-point measurement method provides an efficient and accurate measurement of the phase transition of pure fluids in nanopores. In addition, the procedure enables the measurement of the bulk phase transition simultaneously with that of the confined fluids. The unique ability of the procedure to measure the bulk phase transition simultaneously with that of the confined fluids provides a robust way of verifying the accuracy of the measurements.

Test Methods

Before conducting the experiments, the DSC is calibrated using two standard materials: deionized water and naphthalene. The naphthalene is purchased from Sigma Aldrich and used without further purification. The $CO_2$ gas is UHP grade with a purity greater than 99.97%, purchased from United States Welding, Inc. The UHP-grade gas mixture of $CH_4$ and $C_2H_6$ is purchased from Airgas and Air Liquide, with a mole percentage of about 15±0.3% $CH_4$ and about 85±0.3% $C_2H_6$. The nitrogen gas used is also purchased from United States Welding, Inc., with a purity greater than about 99.5%.

The general setup 1000 for the equipment utilized to measure the vapor pressures of pure substance and the dew points of mixtures using the isochoric method is shown in FIG. 8. The equipment includes a micro-DSC (μDSC) 1002 having a reference vessel 1004 and a test vessel 1006. The equipment further includes a cooling circulator 1008 to assist with temperature control, a pressure transducer 1010, a vacuum pump 1012, a syringe pump 1014, a gas cylinder(s) 1016 that can contain the substance of interest, a sweeping gas circuit 1018 connected to another gas cylinder (e.g., N2) 1020 and a computer 1022.

A high-pressure SETARAM μDSC VII is used in this study. The HP μDSC can operate under either vacuum, atmospheric, or pressurized conditions, with a pressure limit of 400 bar and a temperature range of about −45° C. to about 120° C. Its sensitivity, as provided by SETARAM Inc., is high with a resolution of about 0.04 μW. The system temperature is controlled by using advanced Peltier cooling and heating principle with the assistance of an auxiliary cooling circulator. Two gas-tight high-pressure vessels made of Hastelloy C276, with the same volume of about 1 cm³, are used for each experiment. One is for reference, which is generally empty, and the other contains the test sample.

A highly-sensitive digital pressure transducer manufactured by Mensor (CPT6100), calibrated using a modular pressure controller (GE Druck PACE6000) with the calibration software WIKA-Cal provided by Mensor, is used to measure the pressure of the test vessel. The transducer has a pressure range of about 0 bar to about 414 bar with an accuracy of about 0.01% of full span. The pressure data are acquired synchronously with the heat flow data from μDSC. To ensure accurate recordings of pressure, the distance between the pressure transducer and the test vessel can be minimized. To further mitigate the temperature gradient within the test system as a result of heat transfer from or to the surrounding via tubing connecting the pressure transducer and the test vessel, an insulator can be used.

A rotary vane vacuum pump (DUO 10 M) from PFEIFFER VACUUM is used to evacuate the sample vessel and a high-pressure syringe pump with a digital controller (260D) from TELEDYNE ISCO is used to inject the gas into the test vessel and adjust the pressure to a desired value. The syringe pump has a cylinder capacity of about 266.05 mL and can be used for a pressure of up to about 517 bar. The pump has three delivery modes (constant flow, constant pressure, and dispense modes) and one refill mode, with an adjustable flow rate from about 0.001 mL/min to about 107 mL/min.

A digital cooling circulator with a digital temperature controller from VWR is connected directly to the μDSC to ensure the removal of heat from the two thermostatic walls, as well as to ensure the cooling of the power rack placed in the instrument structure. An analytical balance (TE214S) from Sartorius is used to weigh the liquid sample, with an accuracy of about ±0.1 mg, and a syringe is used to deliver the liquid sample into the test vessel.

Prior to each test, the test cell can be washed using deionized water and dried in a drying oven at about 120° C. for about 2 hours. The test cell can be weighed to ensure that the cell is clean and completely dried.

Calibration of DSC

Although the feedback from SETARAM, as part of the apparatus maintenance, shows that the HP μDSC used is in good condition for both temperature and heat measurement, e.g., for naphthalene, the measured melting point is about 80.54° C. (literature value: about 80.23° C.) and measured enthalpy of melting is about 148.012 J/g (literature value: about 147.6 J/g), a temperature correction procedure can be performed. Two standard materials with known melting points, e.g., water and naphthalene, are employed to perform this temperature correction. Since melting point mainly varies according to the scanning rate used, the melting points of water and naphthalene are measured at three different heating rates, e.g., about 0.05° C./min, about 0.1° C./min, and about 0.5° C./min. The results are processed in a standard least squares method to obtain the coefficients of the temperature correction function, from which the temperature correction for any scanning temperature and rate can be determined. All of these are done using the software package provided by SETARAM Inc. After calibrating, the melting points of water and naphthalene measured are about 0.01° C. and about 80.267° C., respectively, at a scanning rate of about 0.03° C./min.

A. Measuring the Onset of the Vapor-Liquid Phase Transition in Bulk—Isochoric Dew-Point Measurement The isochoric dew-point measurement method was used for measuring the vapor pressure of $CO_2$ and the dew point of a $CH_4/C_2H_6$ mixture. The test system (the tubes and the test vessel inside the calorimetric block of DSC) is first evacuated using a vacuum pump to remove the air from the system and to dry the system thoroughly. The substance of interest (e.g., the gas of interest) is then injected into the test vessel using a syringe pump until a specified initial pressure is reached. The reference vessel is blank. The test system is heated to a temperature above the saturation temperature or dew point temperature of the substance of interest and maintained at that temperature. Heating is used to help equilibrate the system, to help ensure that the test sample is in the vapor phase, and to help ensure a stable pressure and heat flow baseline during the cooling operation. With a constant cooling rate of about 0.03° C./min, the system temperature is then decreased while the heat flow and pressure history are continuously recorded until an exothermic peak appears in the thermogram, after which the system temperature is restored to ambient conditions. The procedure is repeated for different initial pressures.

B. Measuring the Onset of the Vapor-Liquid Phase Transition in Nanopores—Isochoric Dew-Point Measurement The capillary condensation of $CO_2$ and the dew points of a gas mixture (methane/ethane) in SBA-15 mesoporous silica with different pore diameters were measured using the isochoric dew-point procedure provided above. The only difference is that for tests containing adsorbent, a certain amount of SBA-15 is first introduced into the test vessel using a small spatula. Such amounts of SBA-15 are provided above. The adsorbent is kept in a drying oven at about 120° C. for about 24 hours prior to the test.

C. Measuring the Onset of the Vapor-Liquid Phase Transition in Bulk—Isochoric Evaporation-Point Measurement The isochoric evaporation-point measurement method was used to measure temperature and pressure data of $CO_2$ and ethane. The test system (the tubes and the test vessel inside the calorimetric block of DSC) is first evacuated using a vacuum pump to remove the air from the system and to dry the system thoroughly. The substance of interest (e.g., the gas of interest) is then injected into the test vessel using a syringe pump until a specified initial pressure is reached. The reference vessel is blank. The test system is placed at a temperature such that the substance of interest is in the liquid phase and maintained at that temperature. With a heating rate of about 0.03° C./min, the system temperature is then increased while the heat flow and pressure history are continuously recorded until an exothermic peak appears in the thermogram, after which the system temperature is restored to ambient conditions. The procedure is repeated for different initial pressures.

D. Measuring the Onset of the Vapor-Liquid Phase Transition in Nanopores—Isochoric Evaporation-Point Measurement The capillary evaporation of $CO_2$ and ethane in SBA-15 mesoporous silica with different pore diameters (adsorbent S2 and adsorbent S3) were measured using the isochoric evaporation-point procedure provided above. The only difference is that for tests containing adsorbent, a certain amount of SBA-15 is first introduced into the test vessel using a small spatula. Such amounts of SBA-15 are provided above. The adsorbent is kept in a drying oven at about 120° C. for about 24 hours prior to the test.

The isochoric methods described herein accurately determine the onset conditions for vapor-liquid phase transitions for substances and mixtures of substances in bulk and in pores, e.g., nanopores. The isochoric methods and systems described herein rival and/or surpass conventional methods for measuring vapor pressures, dew points, capillary condensation, and capillary evaporation of substances. For example, unlike the conventional isobaric methods, there is no need to optimize the sample size, pinhole size, and the scanning rate of the sample in order to obtain accurate results. Moreover, the isochoric methods and systems described herein are applicable to, at least, volatile substances, high pressure systems, capillary condensation, and capillary evaporation measurements. Further, the isochoric methods described herein are much less time consuming than typical adsorption experiments, reducing the time utilized for measuring a capillary condensation point (or capillary evaporation point) from days, or even weeks, to a few hours.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

What is claimed is:

1. A process for measuring a vapor-liquid transition of a substance in a constant volume system, comprising:
   (a) introducing a substance into a sample cell of a calorimetric block of a differential scanning calorimeter (DSC) at a first initial pressure, the system volume being constant;
   (b) maintaining the substance in a vapor phase;
   (c) cooling the substance at a cooling rate, wherein the cooling rate is from about 0.01° C./min to about 0.1° C./min; and
   (d) generating a thermogram.

2. The process of claim 1, further comprising further comprising evacuating the system prior to introducing the substance into the sample cell.

3. The process of claim 1, further comprising:
   performing operation (a) at a second initial pressure, the second initial pressure being different from the first initial pressure; and
   performing operations (b), (c), and (d).

4. The process of claim 1, wherein the substance comprises more than one compound.

5. The process of claim 1, wherein the cooling rate is about 0.03° C./min.

6. The process of claim 1, wherein the substance comprises a hydrocarbon, a substituted hydrocarbon, or a combination thereof.

7. The process of claim 1, wherein the substance comprises CO, $CO_2$, $N_2$, $SO_2$, Ar, or a combination thereof.

8. A process for measuring a vapor-liquid transition of a substance in a constant volume system, comprising:
   (a) introducing a substance into a sample cell of a calorimetric block of a differential scanning calorimeter (DSC) at a first initial pressure, the system volume being constant;
   (b) maintaining the substance in a liquid phase;
   (c) heating the substance at a heating rate, wherein the heating rate is from about 0.01° C./m in to about 0.1° C./m in; and
   (d) generating a thermogram.

9. The process of claim 8, further comprising evacuating the system prior to introducing the substance into the sample cell.

10. The process of claim 8, further comprising:
    performing operation (a) at a second initial pressure, the second initial pressure being different from the first initial pressure; and
    performing operations (b), (c), and (d).

11. The process of claim 8, wherein the substance comprises more than one compound.

12. The process of claim 8, wherein the heating rate is about 0.03° C./min.

13. The process of claim 8, wherein the substance comprises a hydrocarbon, a substituted hydrocarbon, or a combination thereof.

14. The process of claim 8, wherein the substance comprises CO, $CO_2$, $N_2$, $SO_2$, Ar, or a combination thereof.

15. A process for measuring a vapor-liquid transition of a substance in a constant volume system, comprising:
    (a) introducing an adsorbent into a sample cell of a calorimetric block of a differential scanning calorimeter, the system volume being constant;
    (b) introducing a substance into the sample cell at a first initial pressure;
    (c) maintaining the substance in a vapor phase or maintaining the substance in a liquid phase;
    (d) cooling the substance at a cooling rate when the process comprises maintaining the substance in a vapor phase, or heating the substance at a heating rate when the process comprises maintaining the substance in a liquid phase, wherein the cooling rate or the heating rate is from about 0.01° C./min to about 0.1° C./min; and
    (e) generating a thermogram.

16. The process of claim 15, wherein the adsorbent comprises a microporous particle, a nanoporous particle, a mesoporous particle, or a combination thereof.

17. The process of claim 15, further comprising evacuating the system prior to introducing the substance into the sample cell.

18. The process of claim 15, further comprising performing operations (a)-(e), wherein operation (b) is performed at a second initial pressure, the second initial pressure being different from the first initial pressure.

* * * * *